(12) United States Patent
Li et al.

(10) Patent No.: US 10,049,694 B2
(45) Date of Patent: Aug. 14, 2018

(54) HEAT-ASSISTED MAGNETIC RECORDING HEAD HAVING A NON-UNIFORM AIR-BEARING SURFACE

(71) Applicant: Carnegie Mellon University, Pittsburgh, PA (US)

(72) Inventors: Hai Li, Pittsburgh, PA (US); Jian-Gang Zhu, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 0 days.

(21) Appl. No.: 15/675,135

(22) Filed: Aug. 11, 2017

(65) Prior Publication Data

US 2018/0047418 A1 Feb. 15, 2018

Related U.S. Application Data

(60) Provisional application No. 62/494,531, filed on Aug. 11, 2016.

(51) Int. Cl.
*G11B 11/00* (2006.01)
*G11B 5/60* (2006.01)
*G11B 5/00* (2006.01)
*G11B 11/105* (2006.01)
*G11B 7/126* (2012.01)

(52) U.S. Cl.
CPC .......... *G11B 5/6082* (2013.01); *G11B 5/6088* (2013.01); *G11B 7/126* (2013.01); *G11B 11/10506* (2013.01); *G11B 2005/0021* (2013.01)

(58) Field of Classification Search
None
See application file for complete search history.

(56) References Cited

U.S. PATENT DOCUMENTS

| 5,623,472 | A | * | 4/1997 | Bakx | G11B 7/0045 369/13.27 |
| 5,726,840 | A | * | 3/1998 | Uemura | G11B 5/1871 360/122 |
| 6,771,462 | B1 | * | 8/2004 | Khizroev | G11B 5/1278 360/122 |
| 2002/0034043 | A1 | * | 3/2002 | Okada | G11B 5/012 360/125.02 |
| 2002/0039254 | A1 | * | 4/2002 | Taguchi | G11B 5/012 360/123.05 |

(Continued)

OTHER PUBLICATIONS

Micromagnetic Model Analysis of High Frequency Heat-Assisted Magnetic Recording, Kanai et al, Journey of Applied Physics, Feb. 2015.*

(Continued)

*Primary Examiner* — Tan X Dinh
(74) *Attorney, Agent, or Firm* — Fish & Richardson P.C.

(57) ABSTRACT

A recording head includes a near-field transducer configured to heat one or more portions of a magnetic storage layer to generate a thermal profile in the magnetic storage layer. The recording head includes a write pole configured to generate a magnetization pattern, in the magnetic storage layer, that overlaps with the thermal profile in the magnetic storage layer. The write pole includes a non-uniform surface that faces the magnetic storage layer, the non-uniform surface configured to cause a portion of the magnetization pattern to be approximately linear.

23 Claims, 30 Drawing Sheets

(56) References Cited

U.S. PATENT DOCUMENTS

2004/0047079 A1* 3/2004 Ito .................. G11B 5/012 360/125.13
2004/0228030 A1* 11/2004 Mochizuki ............. G11B 5/012 360/125.03

OTHER PUBLICATIONS

Model Analysis of Magnetic Write Head for Shingled Thermally-Assisted Magnetic Recording, Kanai et al, IEEE Transactions on Magnetics, vol. 50, No. 11, Nov. 2014.*
N. Zhou et al., "Plasmonic near-field transducer for heat-assisted magnetic recording," Nanophotonics, 3(3):141-155 (2014).
J. Gosciniak et al., "Novel droplet near-field transducer for heat-assisted magnetic recording," Nanophotonics, 4(1):503-510 (2015).
G. Ju et al., "High Density Heat-Assisted Magnetic Recording Media and Advanced Characterization—Progress and Challenges," IEEE Trans. Magn., 51(11):1-9 (2015).
H. Li et al., "Analysis of signal-to-noise ratio impact in heat assisted magnetic recording under insufficient heat field," J. Appl. Phys., 117(17):17D133 (2015).
J.-G. (Jimmy) Zhu and H. Li, "Medium Optimization for Lowering Head Field and Heating Requirements in Heat-Assisted Magnetic Recording," 6:8-11 (2015).
B.D. Lubachevsky and F.H. Stillinger, "Geometric properties of random disk packings," J. Stat Phys., 60(5-6):561-583 (1990).
D.A. Garanin, "Fokker-Planck and Landau-Lifshitz-Bloch equations for classical ferromagnets," 55(5):3050-3057 (1997).
J G Zhu and H. Li, "SNR impact of noise by different origins in FePt-L10 HAMR Media," IEEE Trans. Magn., 51(4) (2015).
J.-G. Zhu and H. Li, "Understanding Signal and Noise in Heat Assisted Magnetic Recording," IEEE Trans. Magn. 49(2):765-772 (2013).
H. Li and J.-G. Zhu, "Understanding the impact of Tc and Hk variation on signal-to-noise ratio in heat-assisted magnetic recording," J. Appl. Phys., 115(17):17B744 (2014).
Yasushi Kanai et al., "Micromagnetic model analysis of high frequency heat-assisted magnetic recording," Journal of Applied Physics, 117, 17C506 (2015), pp. 1-5, Feb. 2015.

* cited by examiner

HEAT-ASSISTED MAGNETIC RECORDING HEAD HAVING A NON-UNIFORM
AIR-BEARING SURFACE

CLAIM OF PRIORITY

This application claims priority under 35 U.S.C. § 119(e) to U.S. Patent Application Ser. No. 62/494,531, filed on Aug. 11, 2016, the entire contents of which are hereby incorporated by reference.

BACKGROUND

For current heat-assisted magnetic recording (HAMR), transition curvature of a magnetic pattern in a recording medium degrades both writing and reading operations in the recording medium and reduces a recording density capability in the recording medium. A circular or curved thermal profile generated by the near field transducer causes the transition curvature when recording head field is essentially spatial-uniform. When thermal profile shrinks for ultra-high-density storage, transition curvature can be a primary cause of reduction of signal-to noise ratio and errors in reading and writing. Due to the thermal profile curvature, grains at different crosstrack positions on a recording track on the recording medium experience different downtrack thermal profiles. At different crosstrack positions, recording is not optimized correspondingly, so writing quality is not saturated. This could be also be explained using a recording time window. In addition, the written track width become modulated by the distance between adjacent transitions down track. Current reader designs are not configured for this mode of operation, since current devices include thin films stacked along downtrack direction. Curved readers, which might be able to accommodate current thermal profiles for ultra-high-density storage, are difficult to manufacture and lack robustness.

SUMMARY

A recording head that generates a crosstrack varying field is described, such as for heat assisted magnetic recording applications. A crosstrack-varying field can greatly enhance the signal-to-noise ratio (SNR) in writing and reading data using partially or completely straightened transition edges for bits, increasing a storage density of a magnetic recording medium. The recording heads described provide varying head fields to accommodate various thermal profiles, so that transition curvature is reduced, relative to the transition curvature produced by uniform crosstrack fields, even made approximately linear, eliminating the curvature altogether. The design improves viability of heat assisted magnetic recording by increasing SNR values and increasing recording densities in storage media.

This document describes devices and processes for heat-assisted magnetic recording for data storage. A recording head described herein is configured for minimization or complete elimination of transition curvature to enhance signal-to-noise ratio for heat-assisted magnetic recording. The recording device is configured such that a head field varies along crosstrack direction in a recording medium. Such a configuration of the recording head straightens a transition front of a magnetic pattern caused by the recording head in a magnetic storage layer, which enables higher density storage in the magnetic storage layer and enhances the signal-to-noise ratio when reading data from the magnetic storage layer.

The magnetic pattern includes a thermal guided writer field design. A head field varies along a crosstrack direction in the magnetic storage layer. A shallower anisotropy field temperature dependence, lower thermal gradient, and lower room temperature anisotropy field in recording media can amplify the effect of the recording head described herein.

The recording head includes a near-field transducer configured to heat one or more portions of a magnetic storage layer to generate a thermal profile in the magnetic storage layer; and a write pole configured to generate a magnetization pattern, in the magnetic storage layer, that overlaps with the thermal profile in the magnetic storage layer; where the write pole comprises a non-uniform surface that faces the magnetic storage layer, the non-uniform surface configured to cause a portion of the magnetization pattern to be approximately linear.

In some implementations, the non-uniform surface of the write pole is configured to reduce an amount of curvature of the portion of the magnetization pattern, relative to an amount of curvature of the portion of the magnetization pattern formed by a write pole with a uniform surface.

In some implementations, the non-uniform surface of the write pole is configured to eliminate the amount of curvature of the portion of the magnetization pattern. In some implementations, the write pole further includes a first side facing a first axis that is approximately orthogonal to a second axis along which the write pole is configured to move across the magnetic storage layer; and a second side opposite the first side; where the first side, the second side, or each of the first and second sides comprises a tapered edge proximate to the non-uniform surface. In some implementations, an angle of at least one tapered edge is between 25-65 degrees with respect to the non-uniform surface.

In some implementations, the write pole further includes a third side facing the second axis along which the write pole is configured to move across the magnetic storage layer; and a fourth side opposite the third side, the fourth side being further from the near-field transducer than the third side, where the third side, the fourth side, or each of the third and fourth sides comprises an additional tapered edge proximate to the non-uniform surface. In some implementations, an angle of at least one additional tapered edge is between 25-65 degrees with respect to the non-uniform surface.

In some implementations, the non-uniform surface comprises an indent forming an arcuate edge. The non-uniform surface comprises an indent forming a triangular notch. In some implementations, the non-uniform surface comprises a slot.

In some implementations, the write pole is configured to record, in the magnetic storage layer, at a density of up to approximately 3.0 million flux changes per inch (MFCI). In some implementations, the write pole is configured to generate the magnetization pattern, in the magnetic storage layer, to be less than 60 nanometers along a recording track in the magnetic storage layer. In some implementations, the write pole is configured to cause a magnetic field, across the magnetic storage layer, including an intensity that varies in an approximately parabolic manner across a recording track of the magnetic storage layer. In some implementations, the write pole is configured to cause a magnetic field in proximity to one or more edges of a recording track in the magnetic storage layer, with an increased intensity relative to an intensity of the magnetic field in proximity to a center of the recording track in the magnetic storage layer.

In some implementations, the non-uniform surface comprises a pointed tip configured to extend toward the magnetic storage layer.

In some implementations, the near-field transducer is configured to generate the thermal profile including a thermal gradient between 6K/nm-20K/nm. The magnetic pattern in the magnetic storage layer represents a unit of data. The portion of the magnetization pattern, in the magnetic storage layer, is approximately orthogonal to an axis of motion of the write pole. The non-uniform surface is an indented air-bearing surface.

In some implementations, the recording head includes a near-field transducer configured to generate a thermal profile in a magnetic storage layer of a data storage device; and a write head configured to generate a magnetization pattern in the magnetic storage layer of the data storage device that overlaps with the thermal profile of the magnetic storage layer, the write head including: a return pole; and a write pole connected to the return pole and positioned between the near-field transducer and the return pole, the write pole including a surface parallel to the magnetic storage layer, where the write pole comprises a first side facing the return pole and a second side facing the near-field transducer, with the second side being positioned in the write pole and opposite to the first side, where the write pole is tapered on both a third side and a fourth side that is positioned in the write pole opposite to the third side, and where the surface comprises an indent extending from the first side of the write pole to the second side of the write pole.

In some implementations, a portion of the first side that is in proximity to the surface is tapered. In some implementations, the indent comprises a triangle-shaped notch.

In some implementations, the write head is configured to record in the magnetic storage layer at a density of up to approximately 3.0 million flux changes per inch (MFCI).

In some implementations, the surface of the write pole is shaped by the indent to cause a portion of a boundary of the magnetization pattern to be approximately linear, the portion of the boundary being approximately orthogonal in the magnetic storage layer to an axis of motion of the write head.

DETAILED DESCRIPTION OF THE DRAWINGS

Figure 1A:
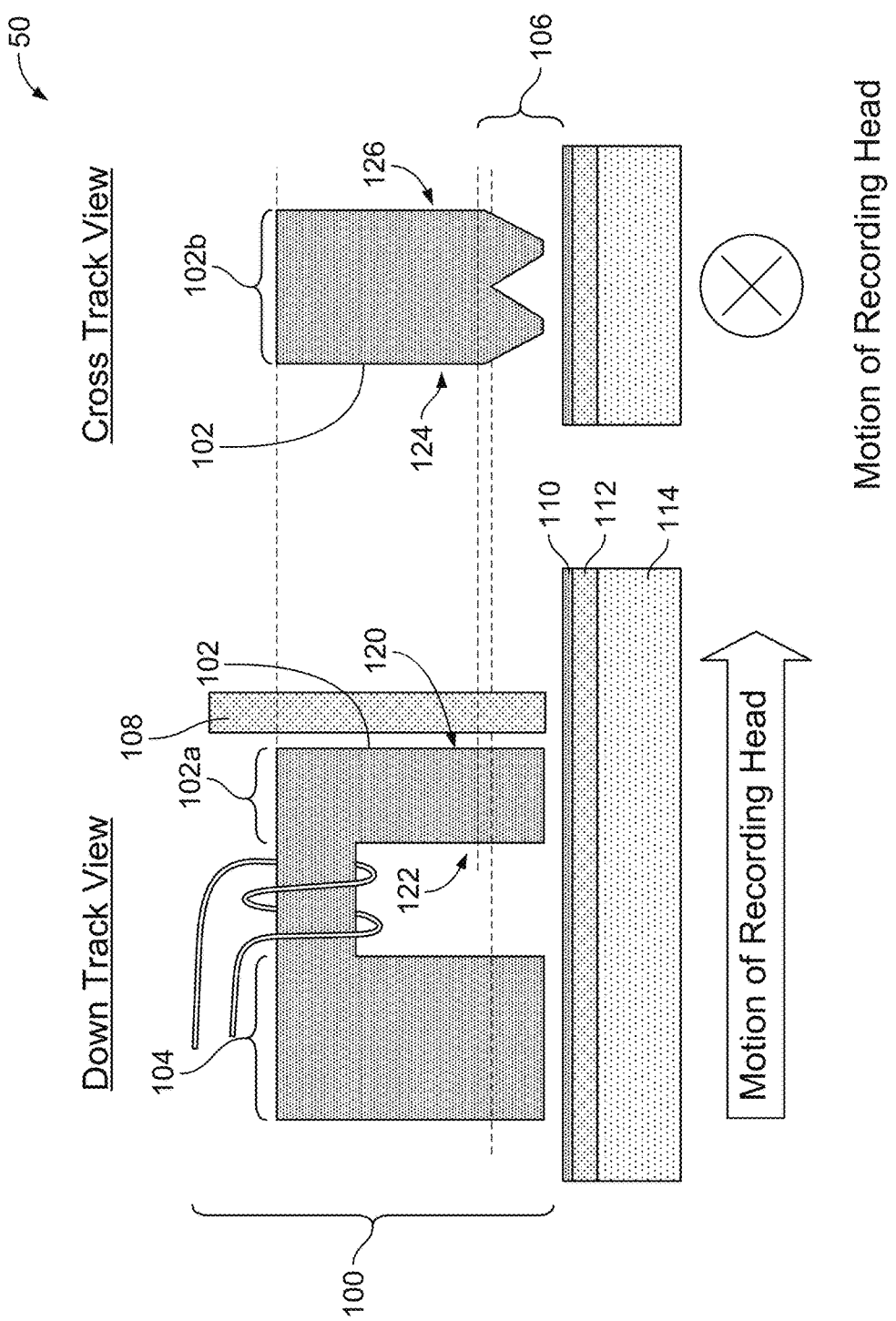
FIG. 1A shows views of a recording head.

FIG. 1A shows views 50 of a recording head for heat-assisted magnetic recording. Two perspectives are shown: a downtrack view and crosstrack view. The downtrack view shows the recording head 100 from a view in which the recording head 100 moves left to right down a recording track in a magnetic storage layer 110, as indicated by the arrow in FIG. 1A. A near-field transducer 108 is positioned proximate a write pole 102a. The near-field transducer 108 heats the magnetic storage layer 110 as described below. The magnetic storage layer 108 is heated so that the recording head 100 is able to magnetize the magnetic storage layer 110 to a predetermined value (e.g., to polarize the magnetic storage layer for representing digital data values in the magnetic storage layer), which is typical for heat-assisted magnetic recording. A return pole 104 is connected to the write pole. The return pole 104 trails the write pole 102a during recording processes.

The magnetic storage layer 110 is a part of a magnetic storage medium which also includes a heat sink 112 and a magnetic soft underlayer 114. The magnetic storage medium stores data in the form of magnetized grains. The magnetic storage medium can be included in a hard-drive disc or other form of magnetic data storage (e.g., for storing digital data). Similarly, the recording head 100 can be a recording head for a hard-drive or other form of magnetic data storage.

As the recording head 100 moves across the magnetic storage layer 110 the write pole 102a generates a magnetic field that magnetizes the magnetic storage layer. For example, the write pole 102a magnetizes the grains of the magnetic storage layer 110 in a first direction to represent a '1' digital data value and a second direction to represent a '0' digital data value. A recording density is limited by the size and shape of the recording patterns caused by the write pole 102a. Since the thermal profile caused by the near-field transducer 108 is circular (as described below with respect to FIG. 2), the magnetization pattern of the write pole having a uniform air-bearing surface (ABS) is not regular, but rather has a curved profile. The write pole 102a has a non-uniform air-bearing surface 106, which is shown at a crosstrack view as included in write pole 102b. The write pole 102b is the write pole 102a shown from a different perspective, collectively called write pole 102. In the crosstrack view, the recording head 100 moves in a direction that is represented by a vector symbol as being "into the page." The surface 106 is not uniform but instead has an indent which causes the magnetization pattern of the write pole 102b to be non-uniform in the magnetic storage layer 110. A portion of the magnetization pattern generated by the write pole 102b having the non-uniform air-bearing surface 106 is approximately linear in a portion of the magnetization pattern.

For example, the write pole 102 has a first side 120 that faces the downtrack axis and a second side 122, opposite the first side, that also faces the downtrack axis (hereinafter "downtrack sides," "downtrack faces," etc.). The write pole 102 has a first side 120 that faces the downtrack axis and a second side 122, opposite the first side, that also faces the downtrack axis (hereinafter "downtrack sides," "downtrack faces," etc.). The write pole 102 has a third side 124 that faces the crosstrack axis and a fourth side 126, opposite the third side 124, that also faces the crosstrack axis (hereinafter "crosstrack sides," "crosstrack faces," etc.).

Figure 1B:
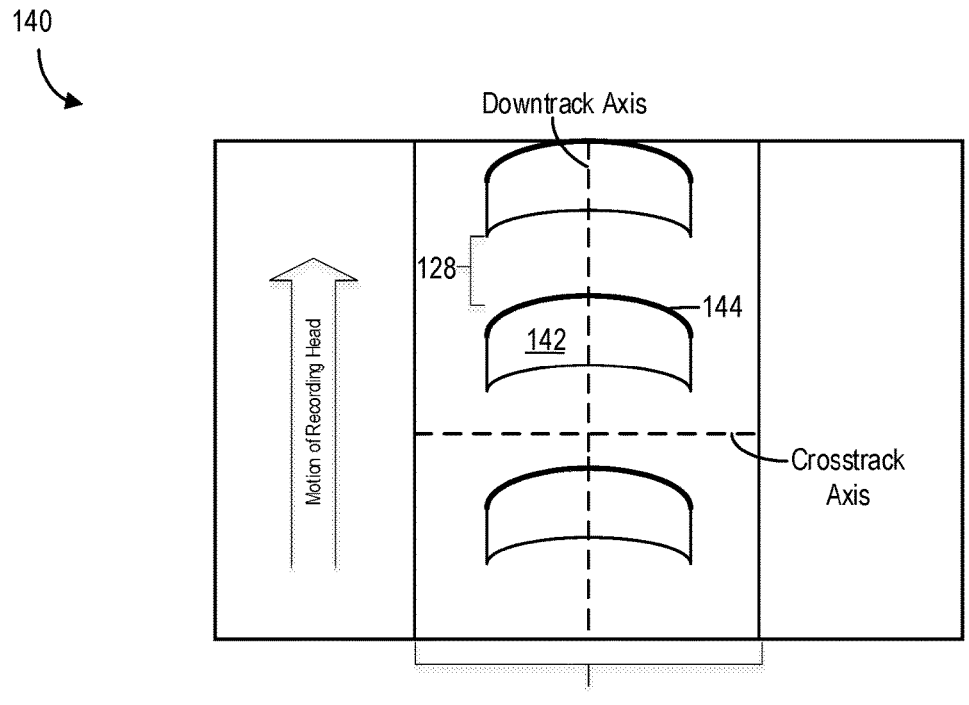
FIGS. 1B-1C show diagrams of recording tracks.
Figure 1C:
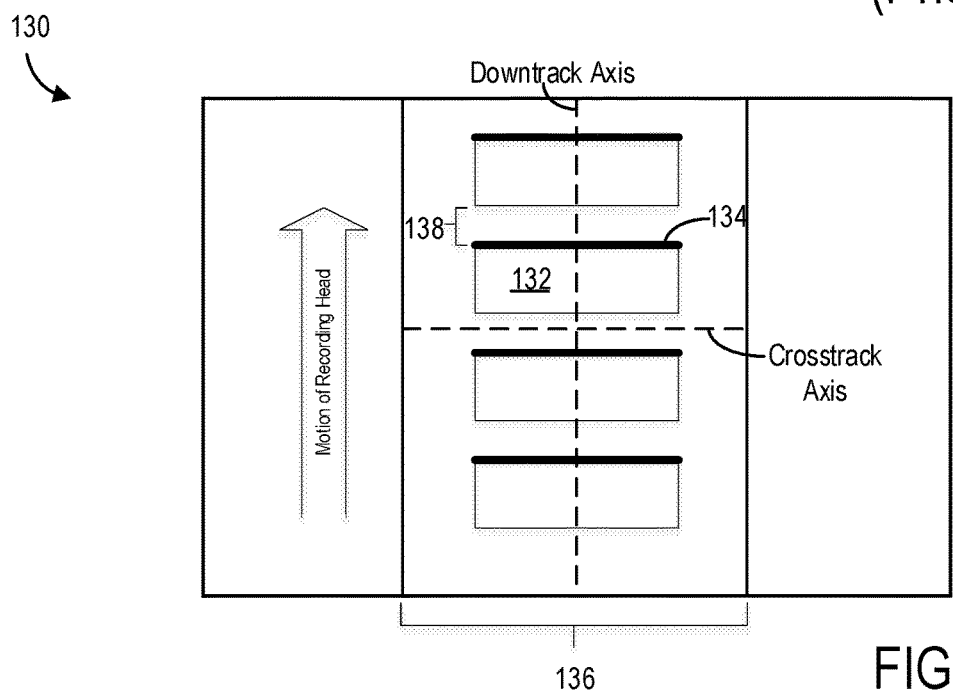

FIGS. 1B-1C show magnetization patterns 140 and 130, respectively. Both FIGS. 1B-1C show recording tracks 146, 136, respectively, from a top-down perspective. Each recording track 146, 136 has a crosstrack axis, representing a lateral axis of the track that is orthogonal to the motion of the recording head, and a downtrack axis, which is parallel to the motion of the recording head.

FIG. 1B shows a magnetization pattern 140 which is generated by a recording head with a uniform air-bearing surface on a write pole. The magnetization pattern 142 represents a conventional pattern. The magnetization pattern 142 has a curved transition edge 144. The shape of the magnetization pattern 142 causes the recording head to generate patterns at a distance 128 between the magnetization patterns so that each pattern can be distinguished during reading operations. If the magnetization patterns are too close, errors occur during reading, increasing a signal-to-noise ratio (SNR), as described in further detail below. However, if the distance 128 is reduced in size, the storage medium has a greater storage density and can store more data, as described in further detail below.

FIG. 1C shows a magnetization pattern 130 which is generated by a recording head with a non-uniform (e.g., indented) air-bearing surface on a write pole. The magnetization pattern 132 includes an approximately linear portion, such as transition edge 134. The shape of the magnetization pattern 132 causes the recording head to generate patterns at a distance 138 between the magnetization patterns so that each pattern can be distinguished during reading operations. Since the magnetization patterns 132 include a linear portion, the distance 138 can be smaller than distance 128, which increases storage density for the magnetic storage medium as described in further detail below.

Figure 2A:
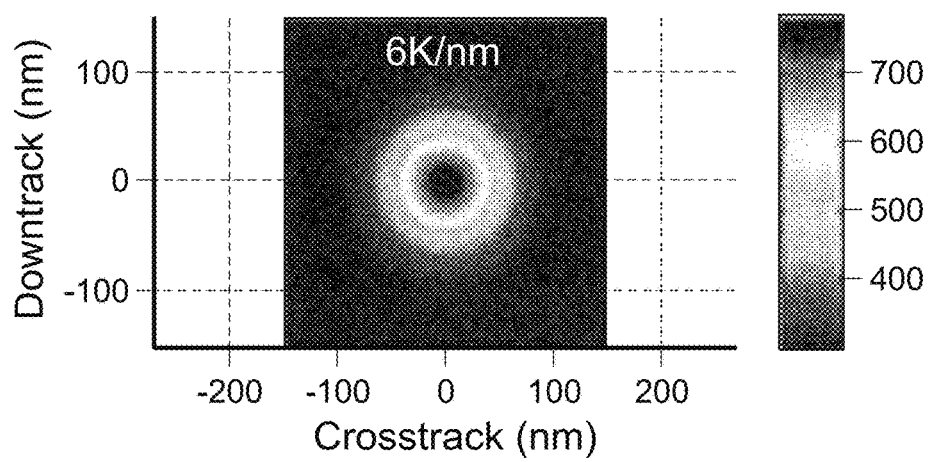
FIG. 2A shows thermal profiles.
Figure 2A:
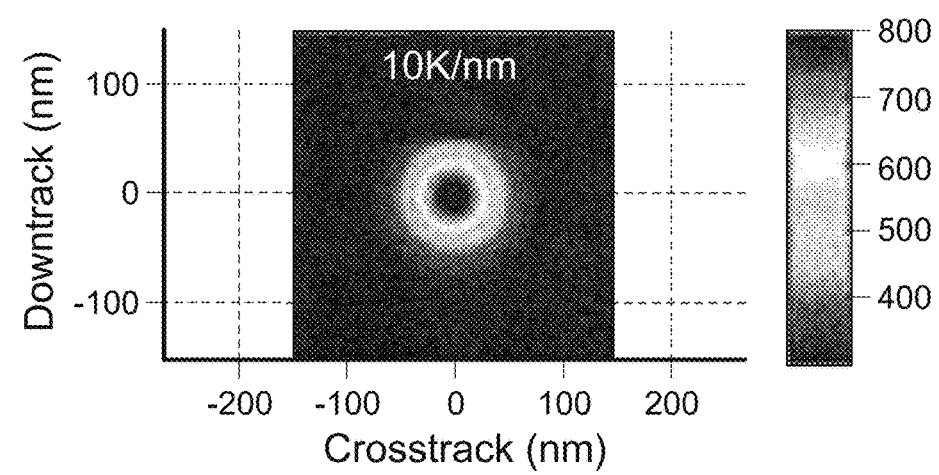

FIG. 2A shows the representative temperature profiles 200, 210 generated by the near field transducer. The thermal profiles are mimicked with a Gaussian function and the two profiles each have a different thermal gradient, 6 K/nm for profile 200, and 10 K/nm for profile 210, along both the downtrack and the crosstrack directions. In realistic situations, the thermal profile can deviate from the Gaussian approximations, but the curvature behavior described above with respect to FIG. 1B remains. For different thermal profiles or near field transducer designs, the following processes are applicable, while the obtained field would vary from design to design. Since the thermal profile is smaller than the magnetic field profile, the transition profile shape is primarily determined by the thermal profile shape. Therefore, the thermal profile curvature causes the transition front curvature described in greater detail below.

Figure 2B:
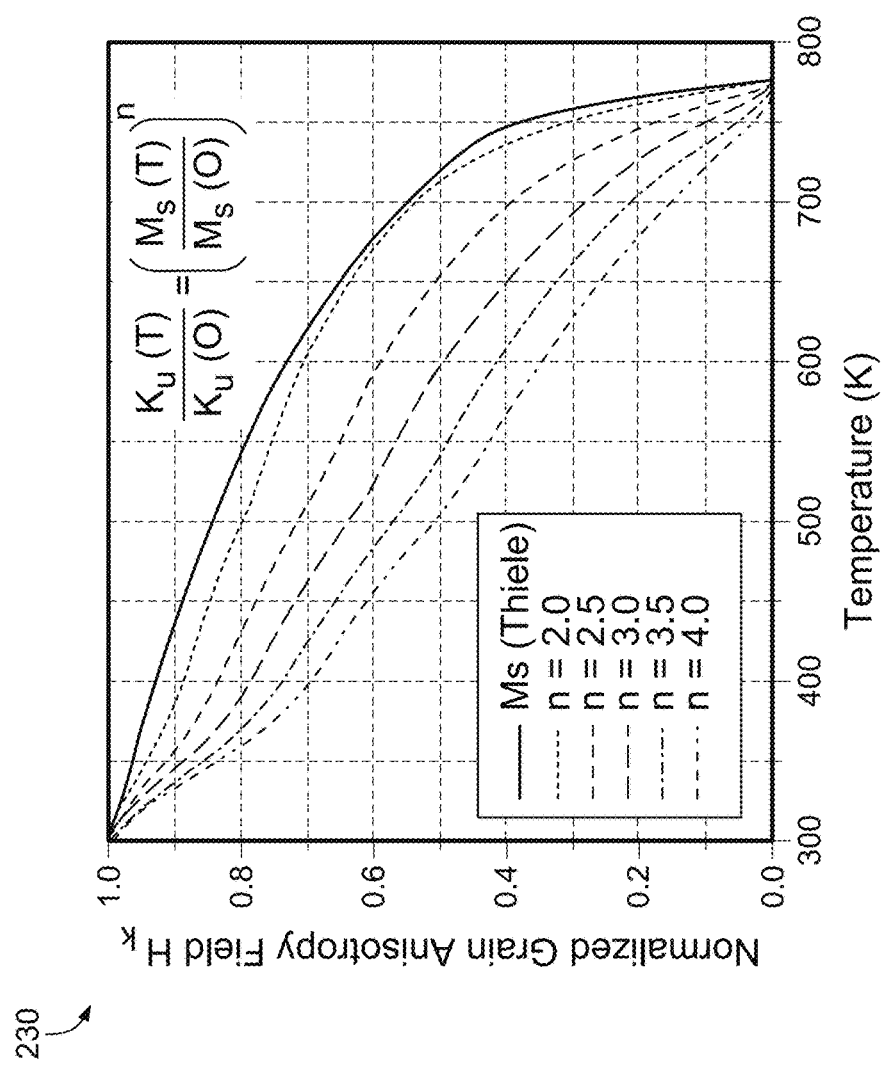
FIG. 2B shows a graph.

FIG. 2B shows a graph 230 depicting a series of normalized anisotropy field $H_k$ versus temperature T curves, with various index n values. As shown in the top right corner, the index n greatly affects the temperature dependence of the Hk or Ms by the following equation:

$$\frac{K_u(T)}{K_u(0)} = \left(\frac{M_s(T)}{M_s(0)}\right)^n$$

With larger index n, the $H_k$ versus T curve is supposed to be shallower with lower $dH_k/dT$ value. In a previous study, the medium with a higher index n could help relax the requirement of both the laser power consumption and the head field value. For a medium with a larger n, the same amount of field change corresponds to a relatively larger change of recording temperature, which makes the transition curvature easier to straighten. With a smaller $H_k$ value, a temperature change due to the field change is also relatively larger.

Figure 3:
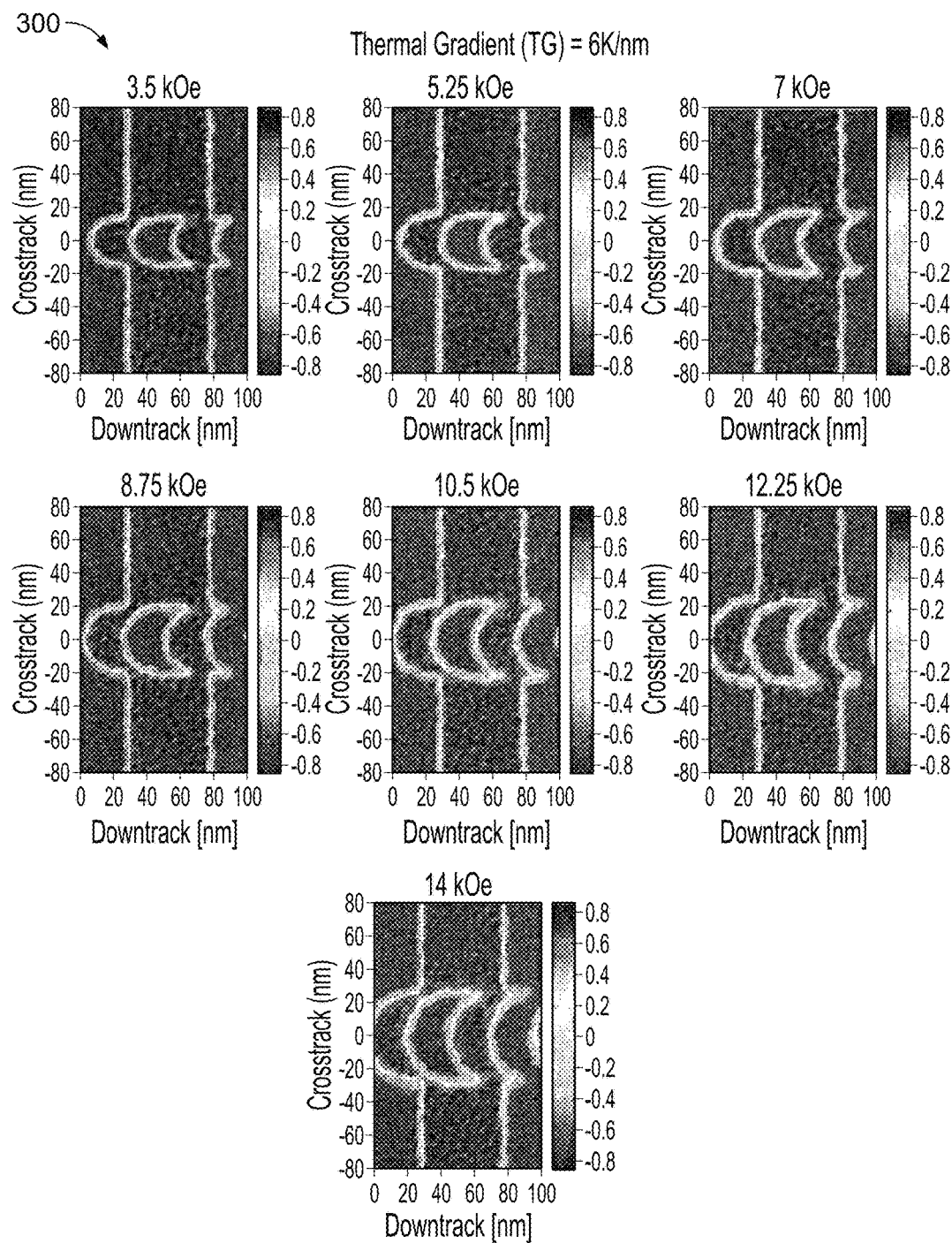
FIG. 3 shows a series of recording patterns.

FIG. 3 shows the magnetization patterns 300 written with a thermal profile which has 6K/nm maximal thermal gradient. Each graph is written with a different spatial-uniform field. To obtain this, a Voronoi pattern is generated and the Landau-Lifshitz-Bloch (LLB) equation is employed to capture magnetic dynamics. The results indicate that a track width gradually increases with larger head field, while a transition front curvature remains similar. This type of behavior is very common in current hard disk drive storages. Since prior recording heads include multiple thin films stacked along the downtrack direction, this transition curvature would causes reading challenges and a reduction of the signal-to-noise ratio. To get larger shift of the transition edge, so that it becomes more linear as described above, a shallower anisotropy field temperature slope, lower thermal gradient, and lower anisotropy field can be included. In the specific simulation graphs here, the index n is selected to be 3.

Figure 4:
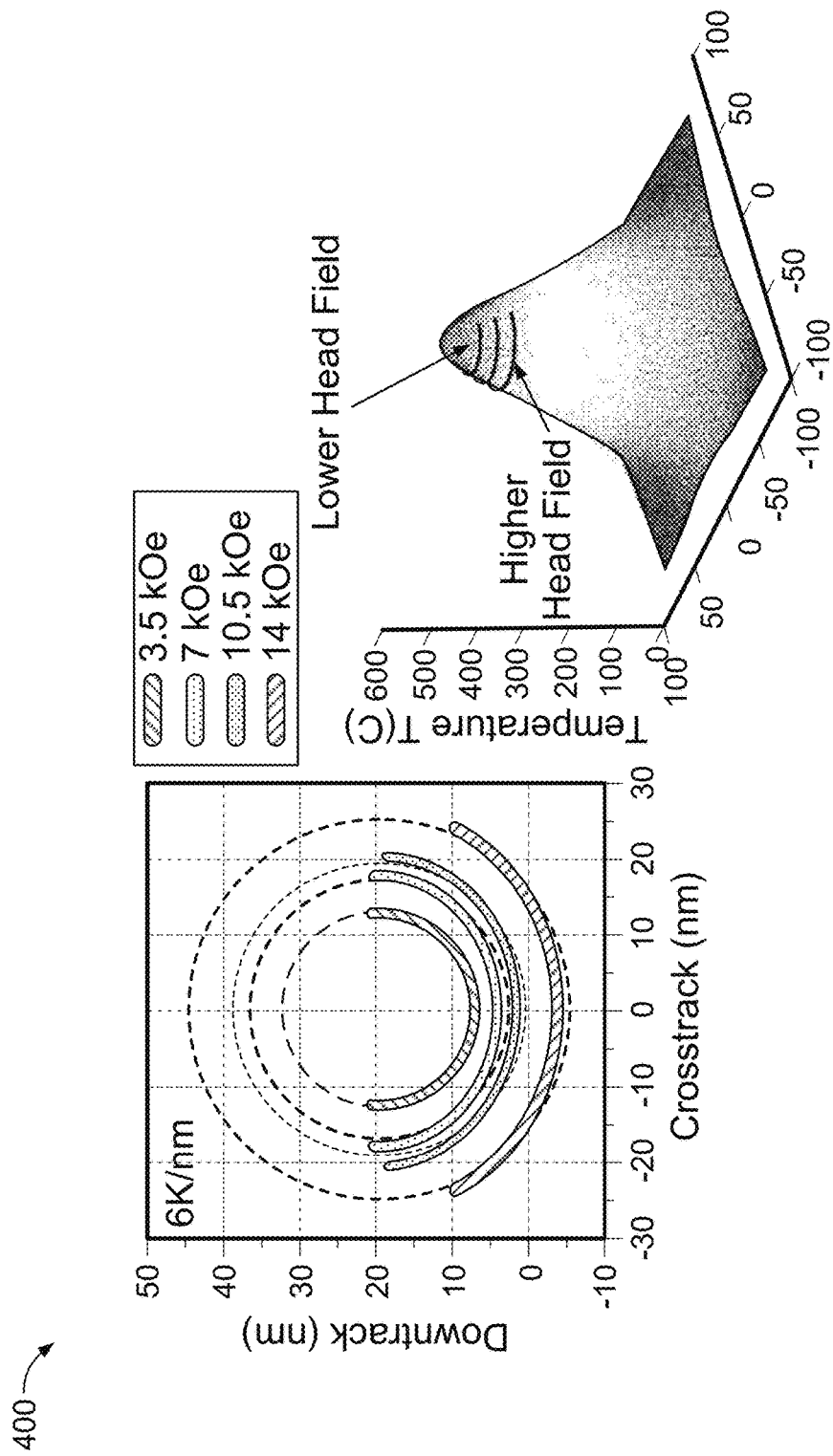
FIG. 4 shows the recording transition fronts.

FIG. 4 shows an illustration 400 of transition fronts with various uniform head field magnitudes using the same circular thermal profile. A corresponding thermal contour map is given for comparison. The circular thermal profile leads to the quasi-circular transition curvature of bit front, as shown above with respect to FIG. 1B. When a head field value is larger, the radius of the curvature is larger and the corresponding recording temperature is lower with respect to the peak temperature of thermal profile.

Figure 5:
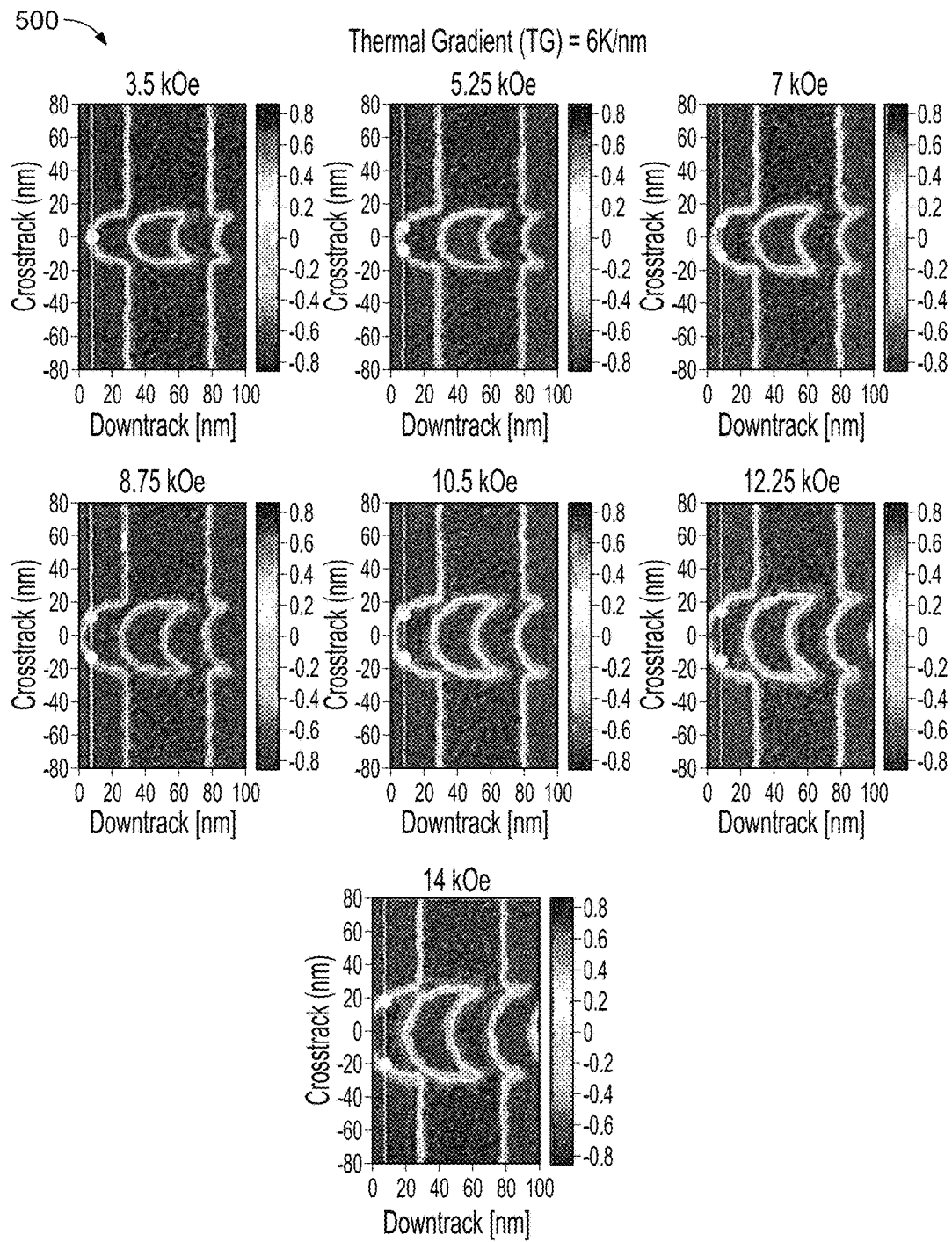
FIG. 5 shows a series of recording patterns.

FIG. 5 shows the same recording patterns 500 as shown in FIG. 3. A white vertical line at 8 mn downtrack (determined by the downtrack position of transition front at the track center, when head field is 3.5 kOe) is present in each graph. The downtrack position of the vertical white line is determined by the transition front center position of the specific bit (the first bit here, could be other bits). Using this line to intersect with each of the recording patterns at different head field, two intersections points are found to locate at different crosstrack positions. The intersection points of the vertical line and the transition front are shown using white solid dots. With larger head field, the dots are further from the track center. In the simulation setting, the writer component is moving towards right direction with respect to the recording medium. The transition shifts toward the left direction using a greater head field. Consequently, the intersection is further away from the track center.

Figure 6:
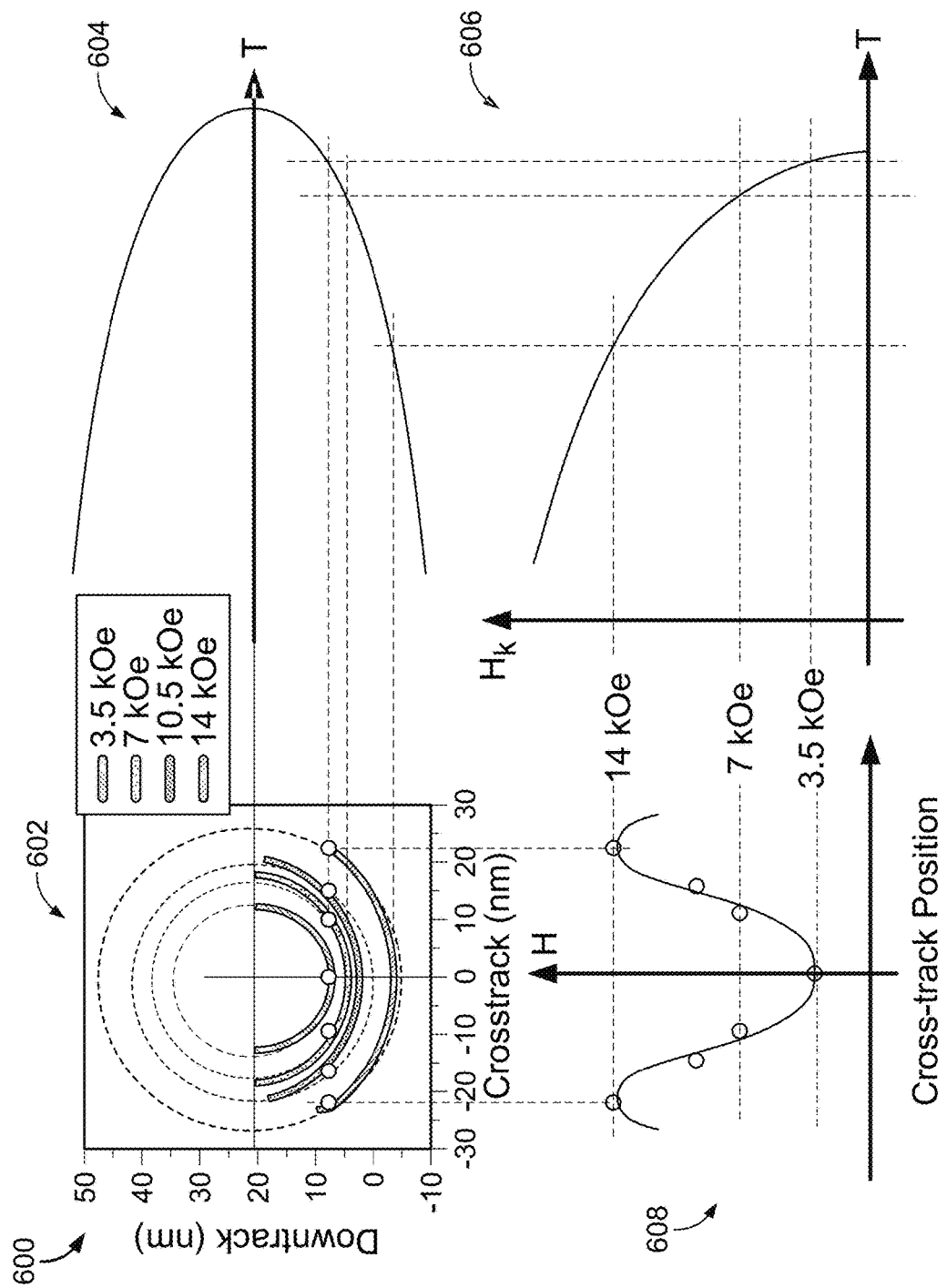
FIG. 6 shows a schematic summary of logic to generate the desired crosstrack varying field.

FIG. 6 shows the schematic summary 600 of logic to generate the desired crosstrack varying field to straighten a portion of the magnetization profile. The procedure starts with top left graph 602 and obeys a clockwise order. With multiple writings with a uniform field, a thermal profile Hk vs. T curve and the desired crosstrack field are determined. Graph 602 shows a transition font with various uniform head field values are obtained during recording. A straight line along the crosstrack axis intersects with each of the transition front curve and relevant crosstrack positions. With a specific thermal profile 604, the corresponding recording temperatures are shown. Using the same 1-h versus T curve in graph 606, the corresponding temperatures are shown. Along with the previously obtained crosstrack coordinates of the intersection points in graph 602, the crosstrack varying head field is shown in graph 608.

Figure 7:
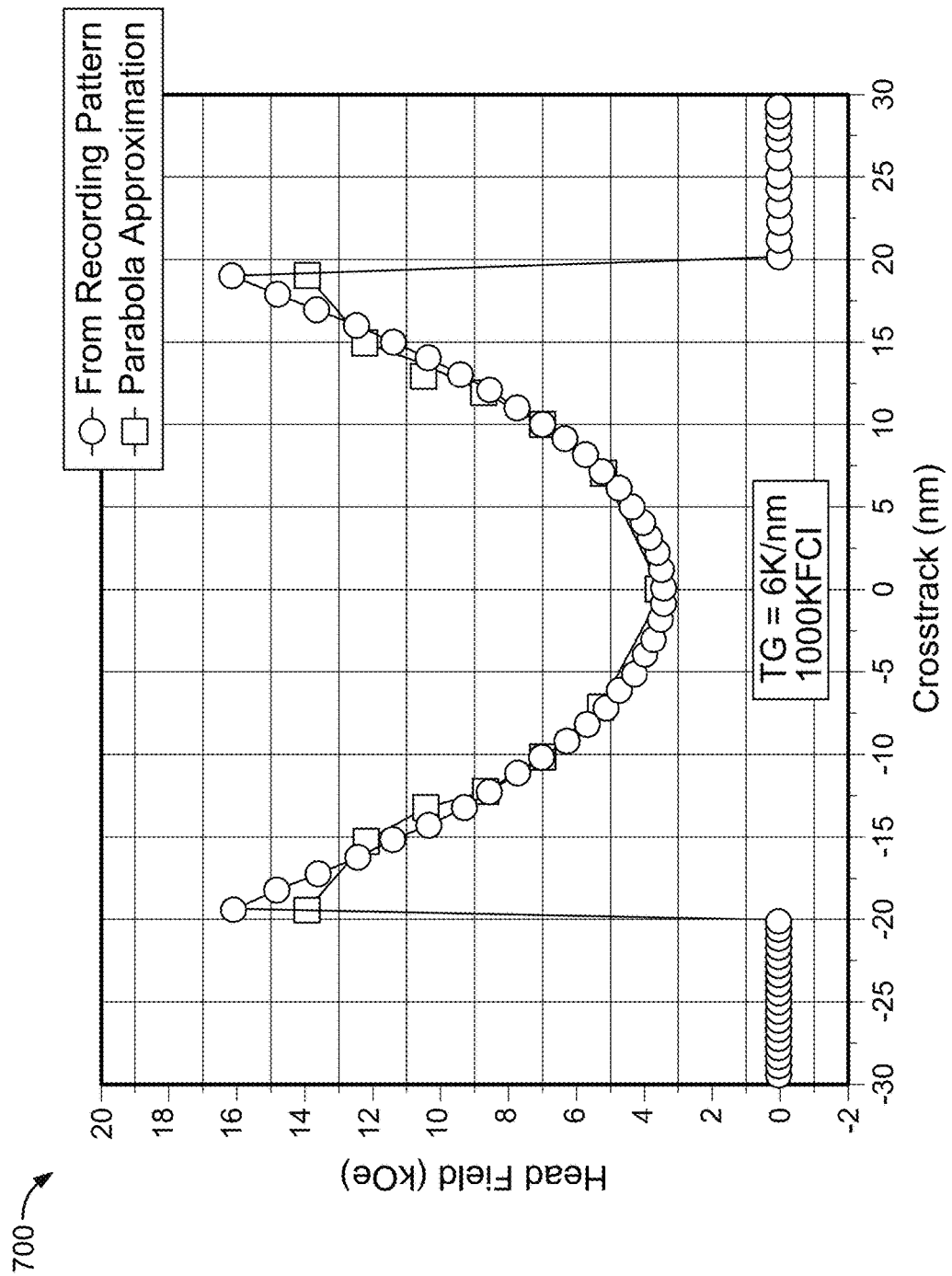
FIG. 7 shows a head field as a function of the crosstrack position.

After collection of the intersection points in FIG. 5 at various head field values, the data points are plotted as shown in the graph 700 of FIG. 7. A parabola function approximates the crosstrack dependence of the head field. A first curve is the sampled data points and a parabola curve is utilized to approximate the behavior of the sampling data points. The head field increases when the crosstrack position deviates away from the track center. While the parabola approximation gives a higher field at around 20 nm, where the track edge would be, the necessary field can be determined according to this approximation. Beyond 20 nm (the track edge), the head field quickly decreases to avoid adjacent track erasure. The thermal profile confines the writing within the expected track, since the product of the thermal gradient and anisotropy field temperature gradient gives a very high effective field gradient.

Figure 8:
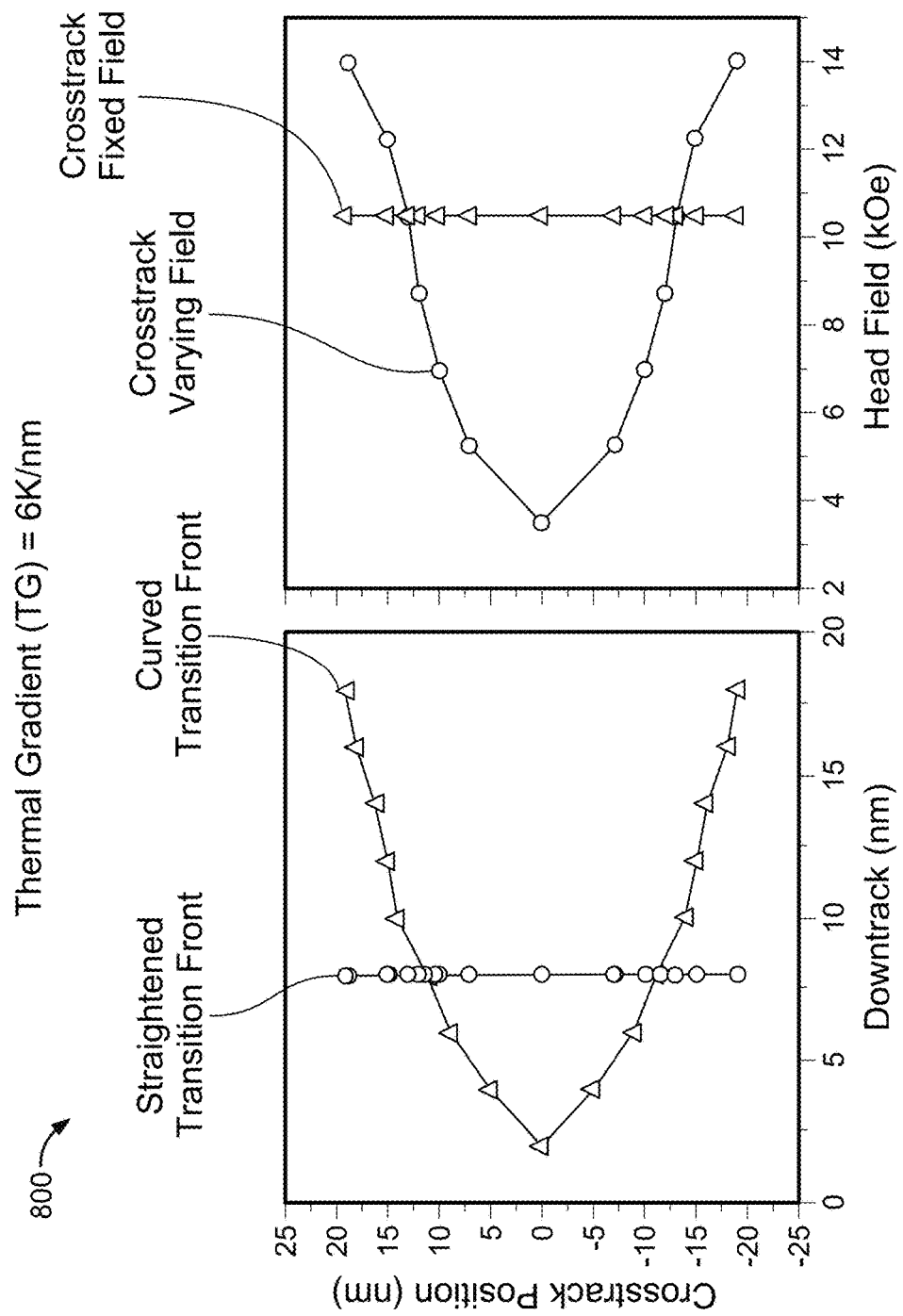
FIG. 8 shows a curved transition front profile.

FIG. 8 includes graphs 800 that show transition fronts caused by both uniform and non-uniform air-bearing surfaces of the write pole of the recording heads. The curved transition front profile generated with a spatial-uniform write field and a straight transition front profile generated with a crosstrack varying write field. In the right graph, the spatial-uniform write field and the crosstrack varying write field are plotted together to compare. The straightened transition front consists of the partial recording pattern at different head field, so that the curvature is alleviated or eliminated.

Figure 9:
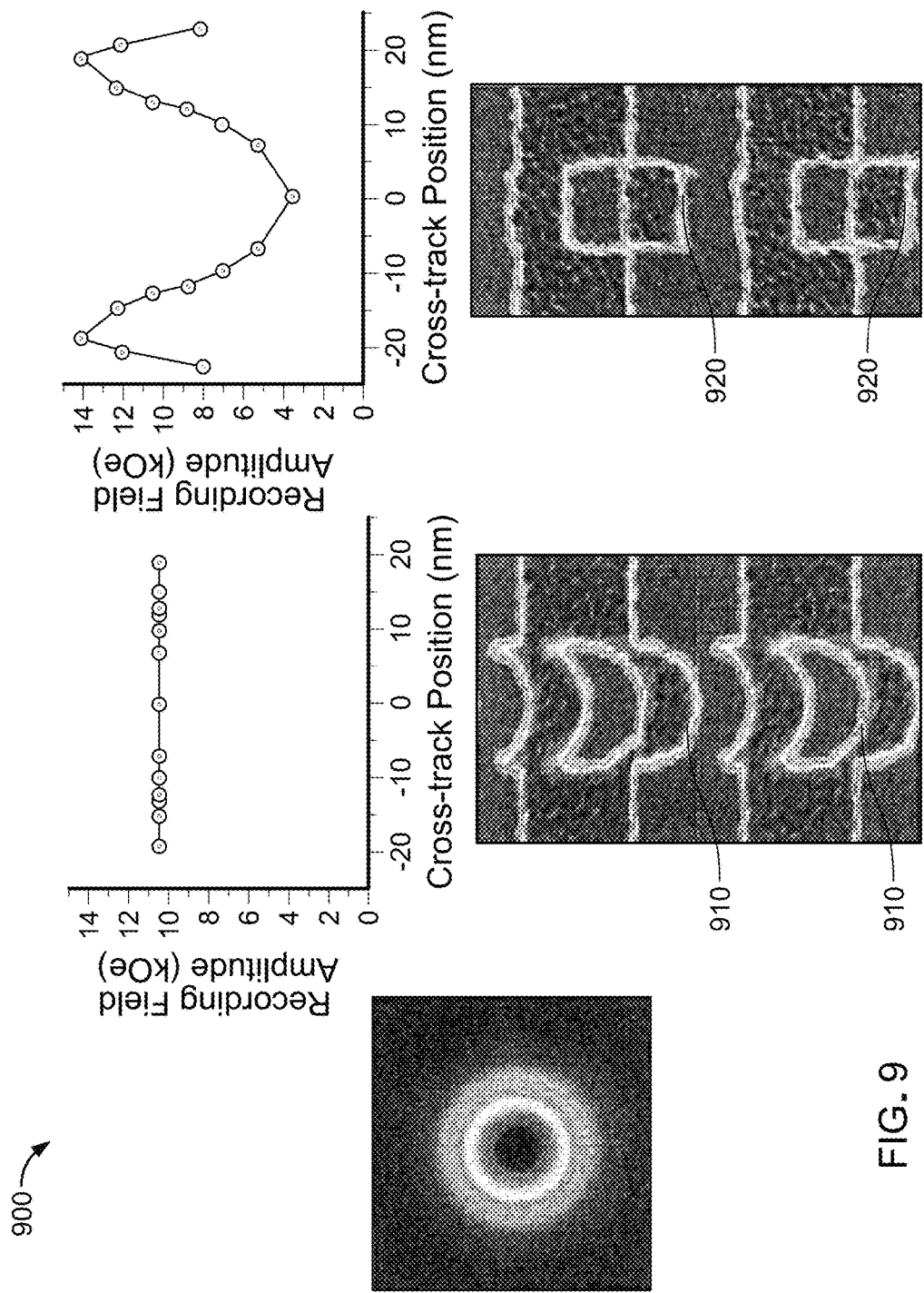
FIG. 9 shows magnetization recording patterns.

FIG. 9 shows the representative magnetization recording patterns 900 using uniform head field (left pattern) and crosstrack varying head field (right pattern) with the same circular thermal profile on the left hand side. The case with crosstrack varying field has straightened transitions 910, while the regular uniform head field case has curved transitions 920.

Figure 10:
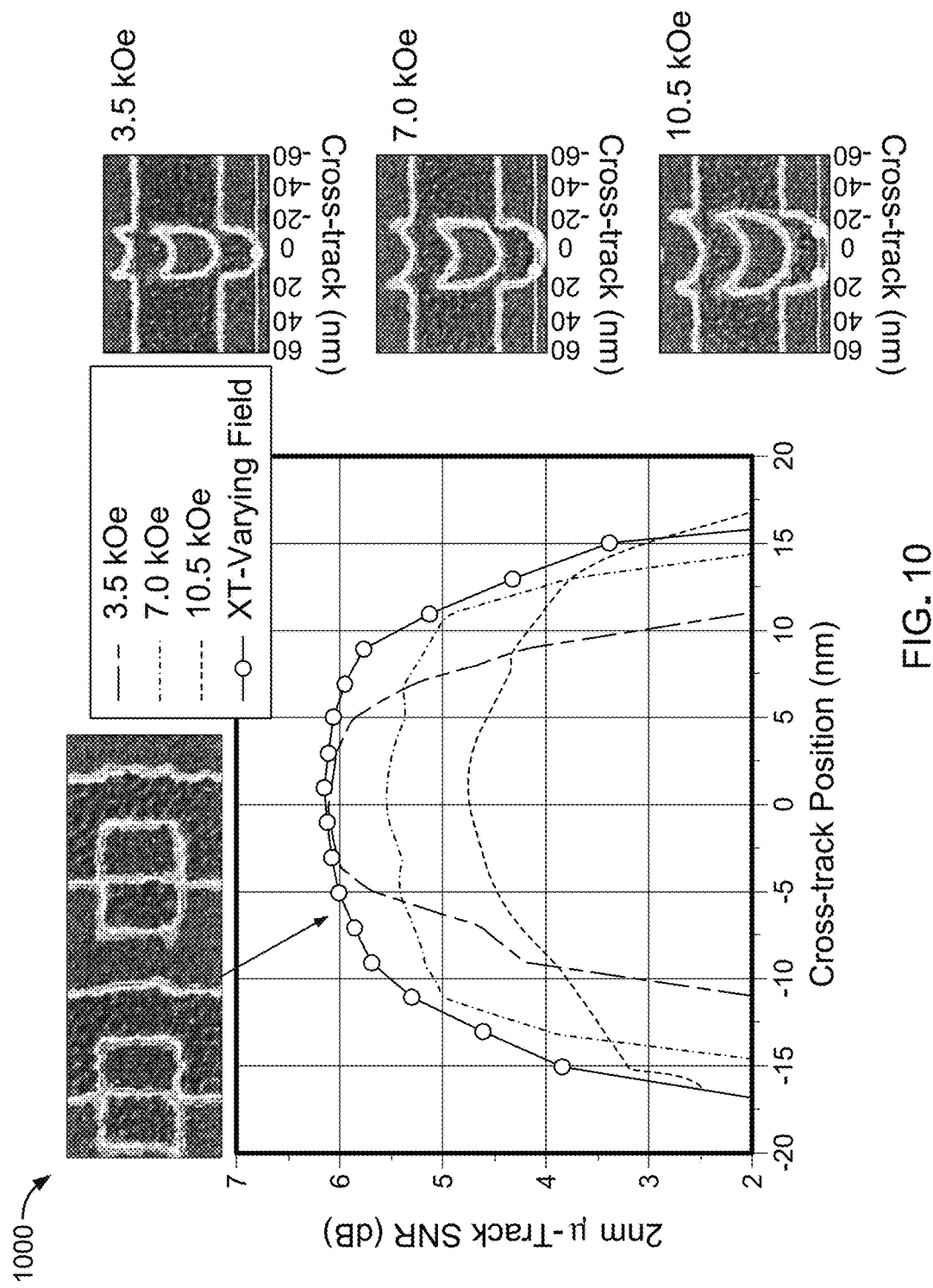
FIG. 10 shows SNR data for different crosstrack positions.

FIG. 10 shows a graph 1000 including the micro track SNR (read with 2 nm by 2 nm square reader) along crosstrack position for different uniform field cases (3.5 kOe, 7 kOe and 10.5 kOe) and a crosstrack varying field case (where Oe is a unit Oersted). At the position further away from the track center, the SNR gradually starts to drop. For the uniform field case, the reduction of SNR is more significant. For the crosstrack-varying field case, the crosstrack SNR is much greater than the other cases.

Figure 11:
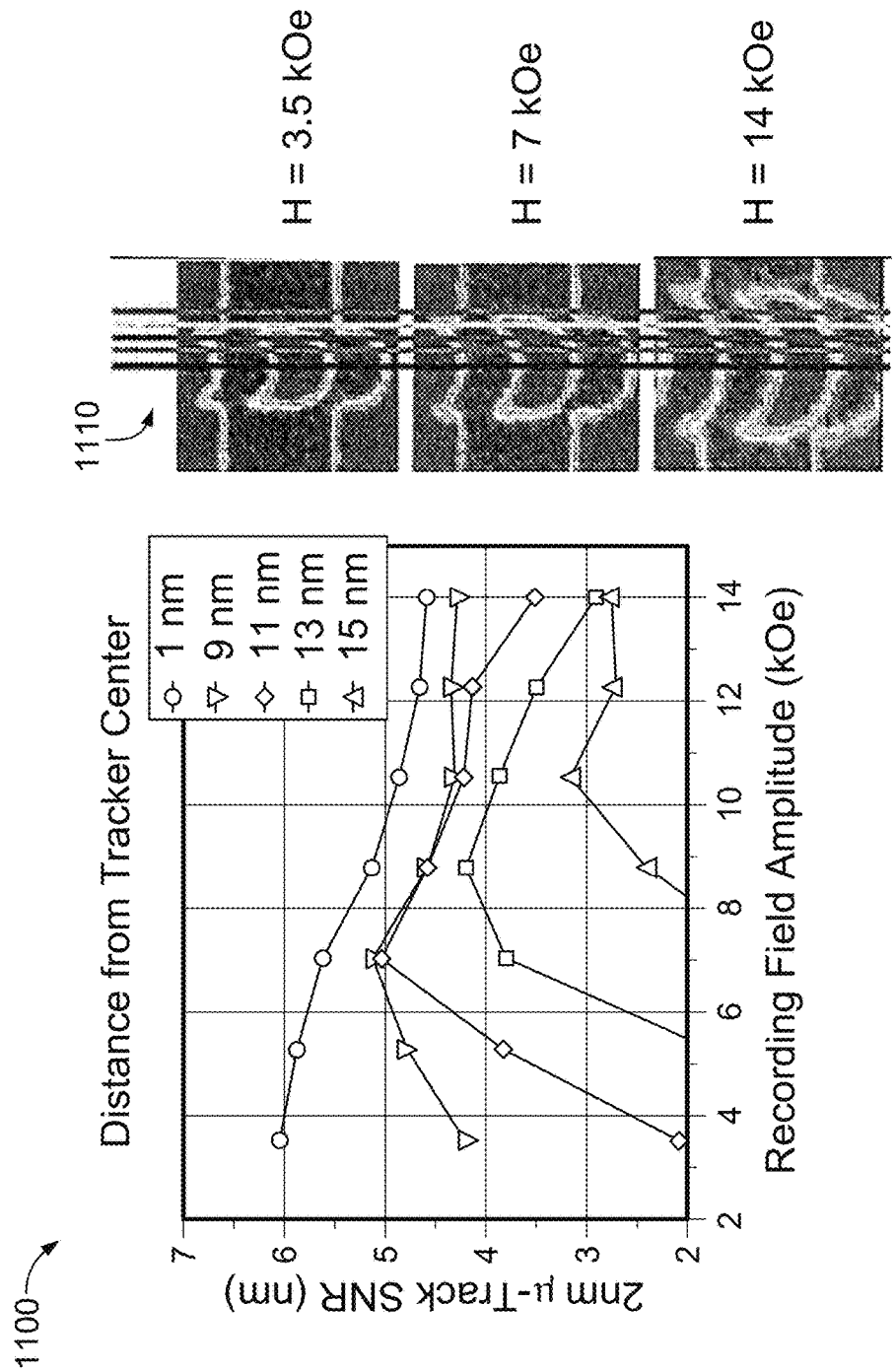
FIG. 11 shows a graph of the head field dependence of the micro track SNR for different crosstrack positions.

FIG. 11 shows a graph 1100 representing the head field dependence of the micro track SNR for different crosstrack positions (1 nm, 9 nm, 11 mn, 13 nm and 15 nm) as labeled by the vertical lines over the recording patterns 1110 on the right hand side. For each SNR value, there exists a head field value. For the center track, the head field is lower, and for the position away from the track center, the head field increases. Field dependence can change different amounts for different medium properties.

Figure 12:
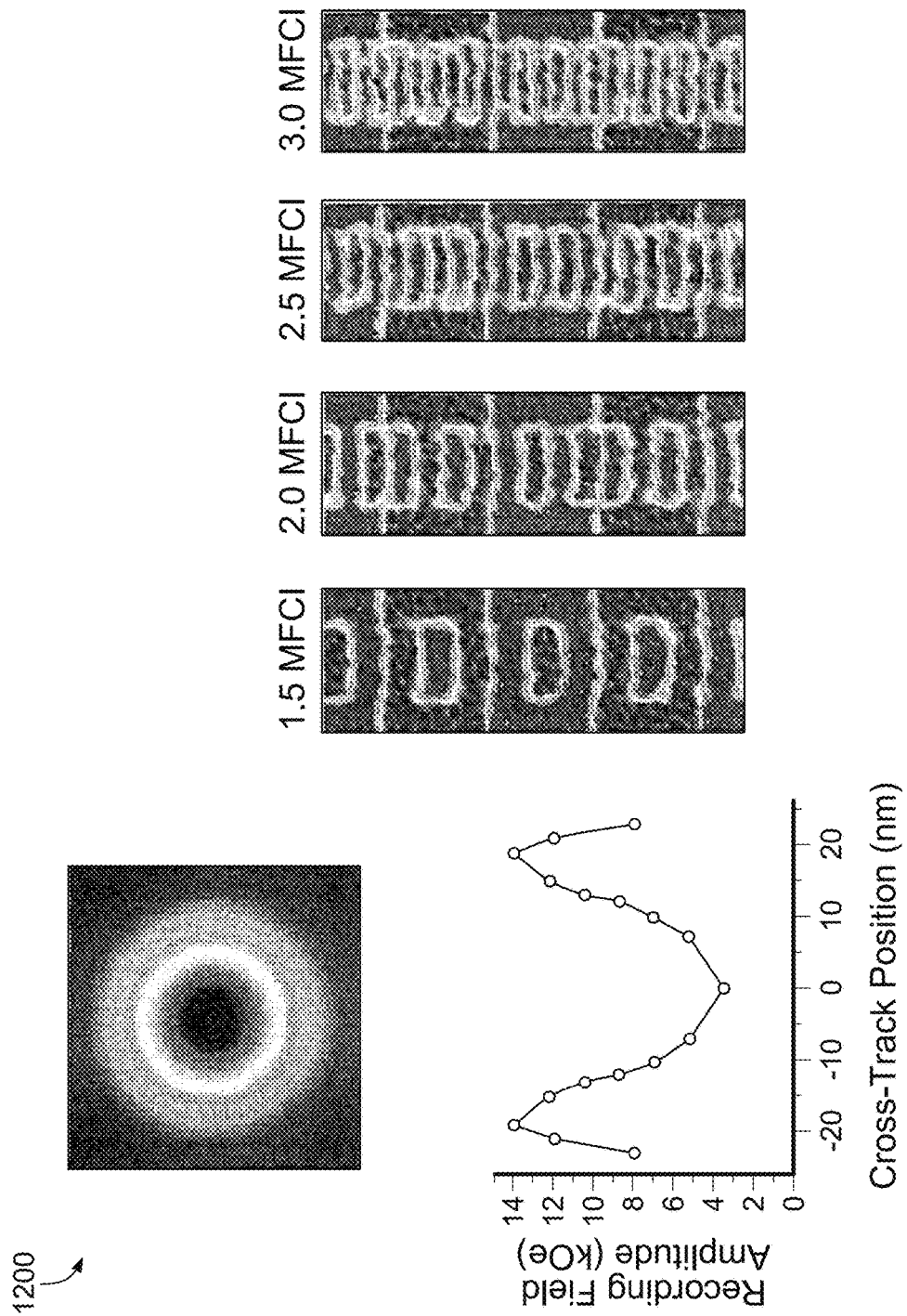
FIG. 12 shows average magnetization recording patterns at different linear densities.

FIG. 12 shows the average magnetization recording patterns 1200 at different linear densities using the same circular thermal profile and crosstrack varying head field. The patterns shown here are general and representative. The results validate that this technique is applicable for different storage densities. For example, recording tracks having densities of 1.5 million flux changes per inch (MFCI), 2.0 MCFI, 2.5 MCFI, and 3.0 MCFI. While these four recording densities are shown as examples, any linear recording density up to three million flux changes per inch can be achieved.

Figure 13:
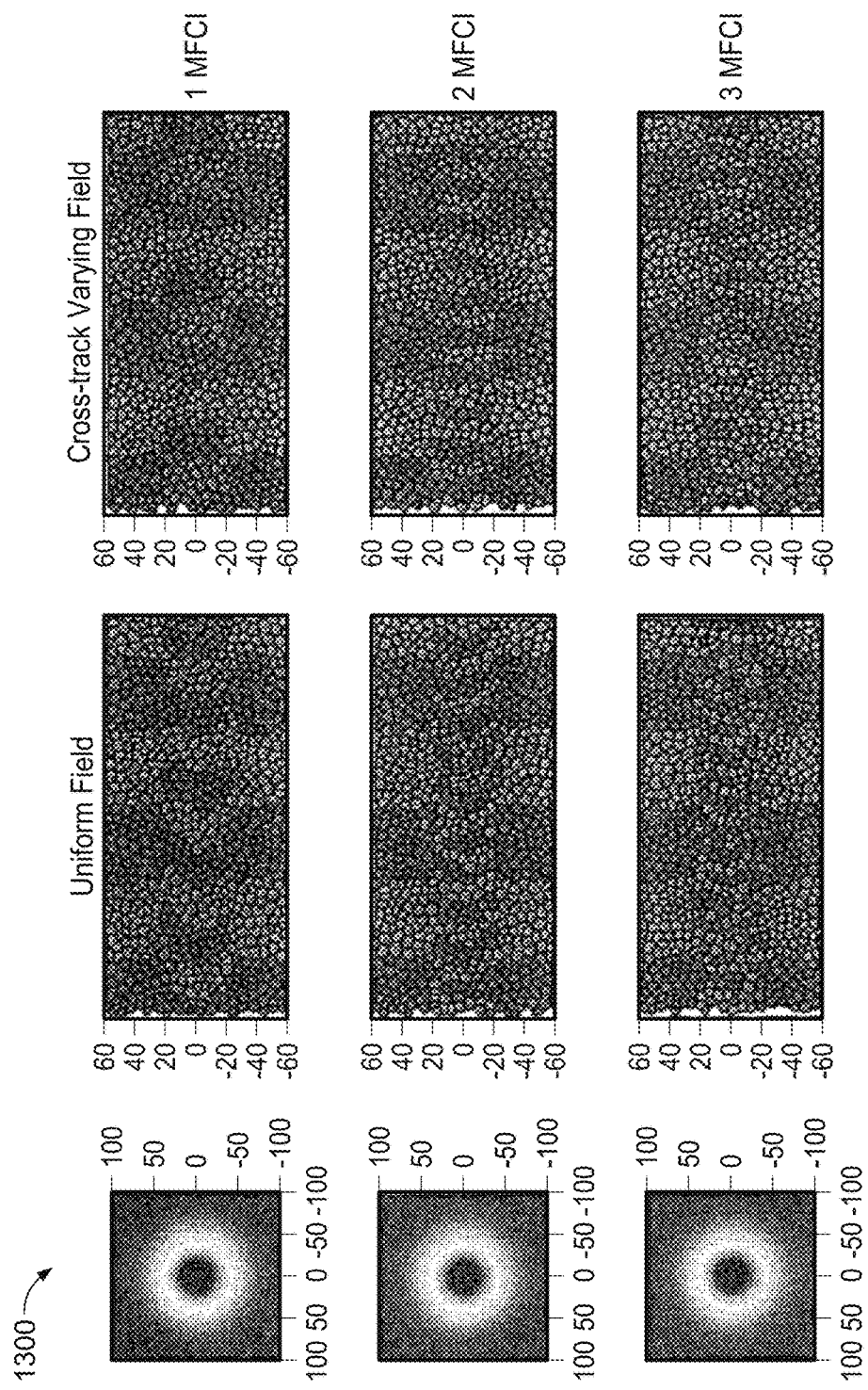
FIG. 13 shows representative magnetization patterns.
Figure 14:
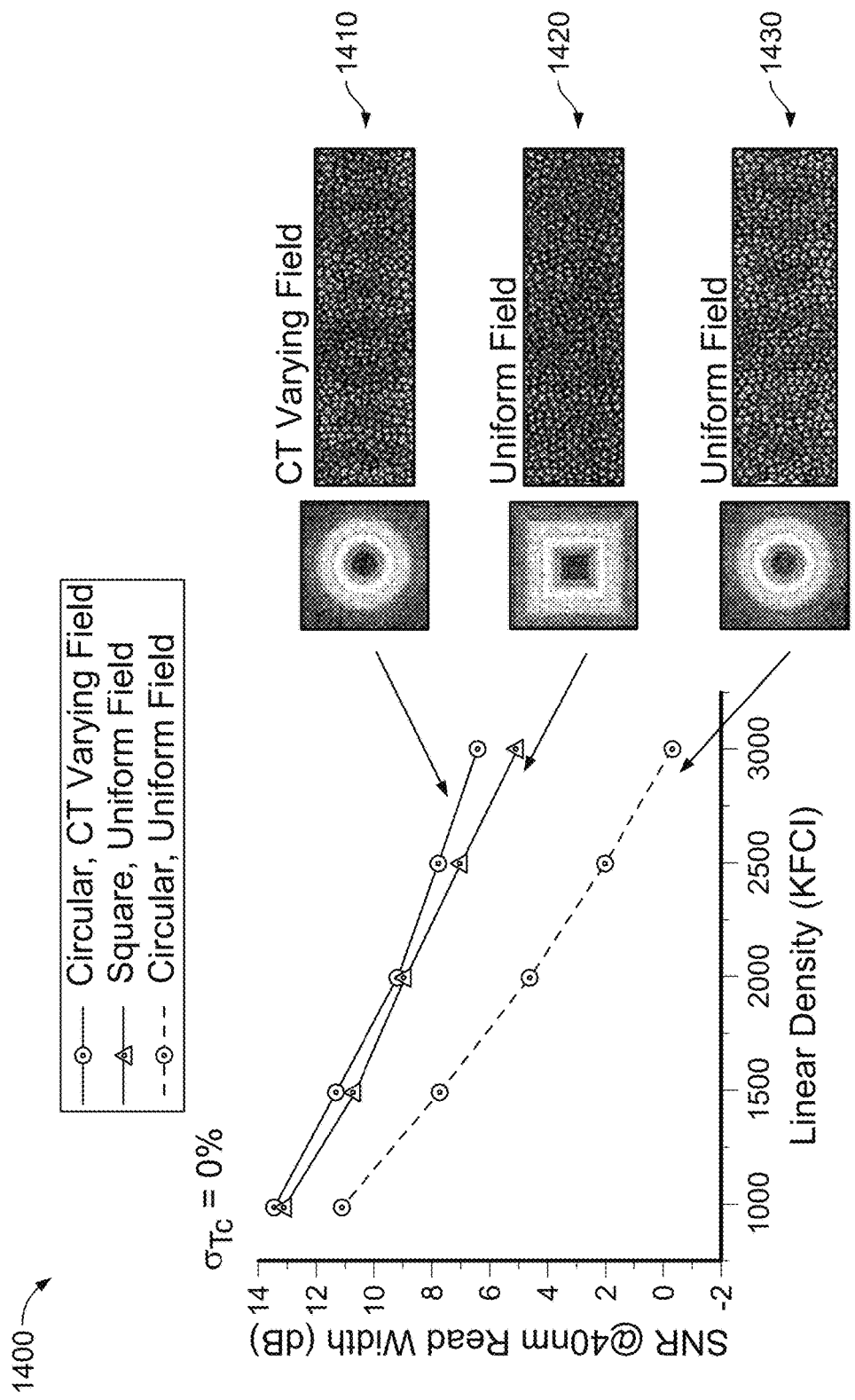
FIG. 14 shows a graph of SNR versus linear density.

FIG. 13 shows representative magnetization patterns 1300 from a uniform head field (left column) and crosstrack varying head field (right column) with the same circular thermal profile. Various linear densities, including 1 MFCI, 2 MFCI and 3 MFCI, are shown. The uniform field of a uniform air-bearing surface of a write pole causes a curved transition edge, while the varying field of the non-uniform air-bearing surface of a write pole causes straightened transition edges. Additionally, the uniform field written patterns degrade faster at higher linear density, while the patterns written with varying field still have decent recording quality even at 3 MFCL FIG. 14 includes a graph 1400 that shows the 40-nm-reading SNR versus linear density for three different scenarios, circular thermal profile & varying field 1410, square thermal profile & uniform field 1420, and circular thermal profile & uniform field 1430. For higher linear density values, the SNR decreases approximately linearly. The "circular thermal profile & CT varying field" 1410 shows the highest SNR. The "square thermal profile with uniform" 1420 case shows less SNR, while the "circular thermal profile with uniform field" 1430 shows the lowest SNR.

Figure 15:
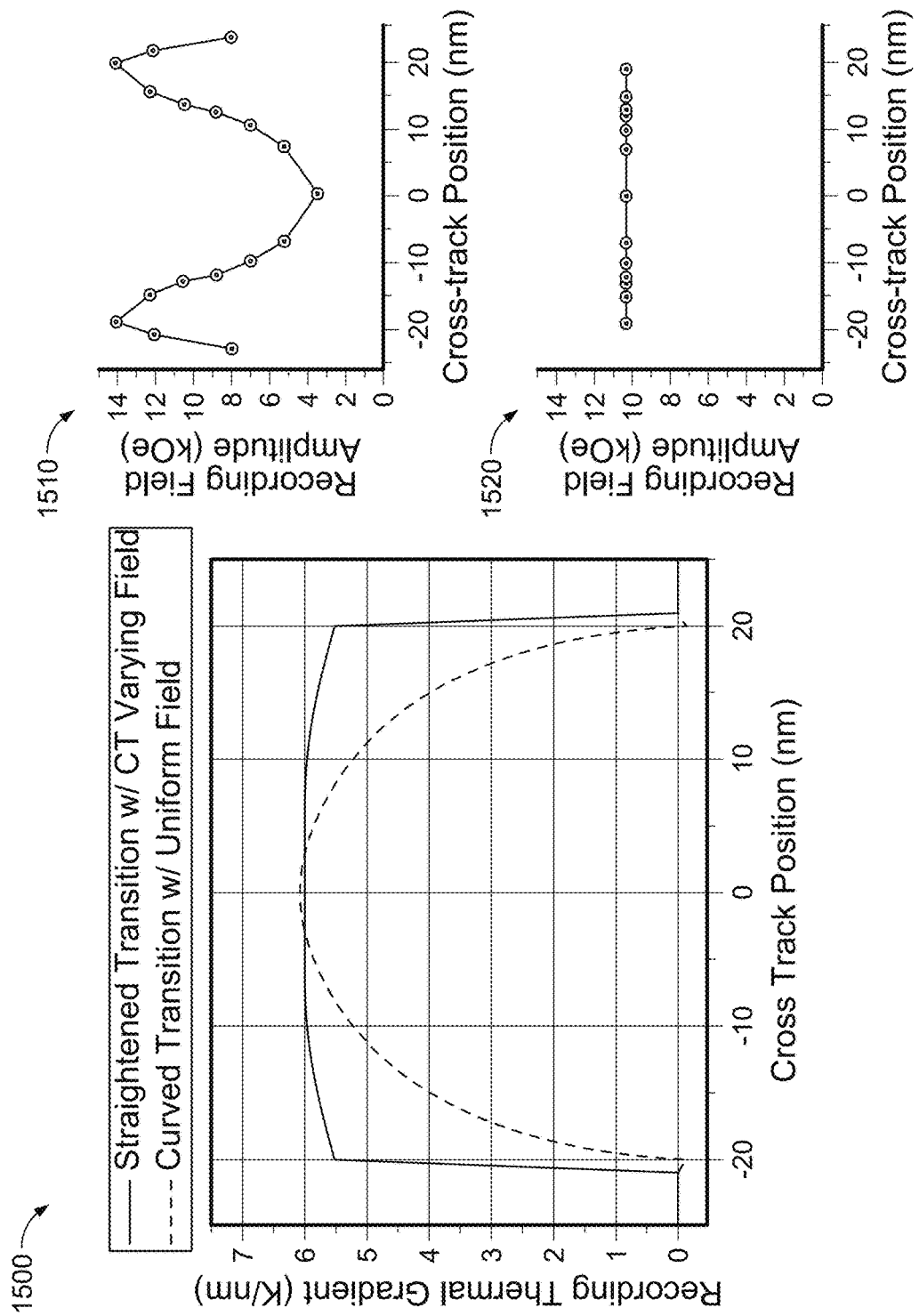
FIG. 15 shows the thermal gradient at the recording temperature for crosstrack varying field and uniform field.

FIG. 15 includes graphs 1500, 1510, and 1520 showing the thermal gradient at the recording temperature for crosstrack varying field and uniform field. The crosstrack varying field case has a similarly high thermal gradient as the center position, no matter where the crosstrack position is (within the track width). However, for the uniform field case, the thermal gradient obviously starts to decrease when the crosstrack position deviates from the track center.

Figure 16:
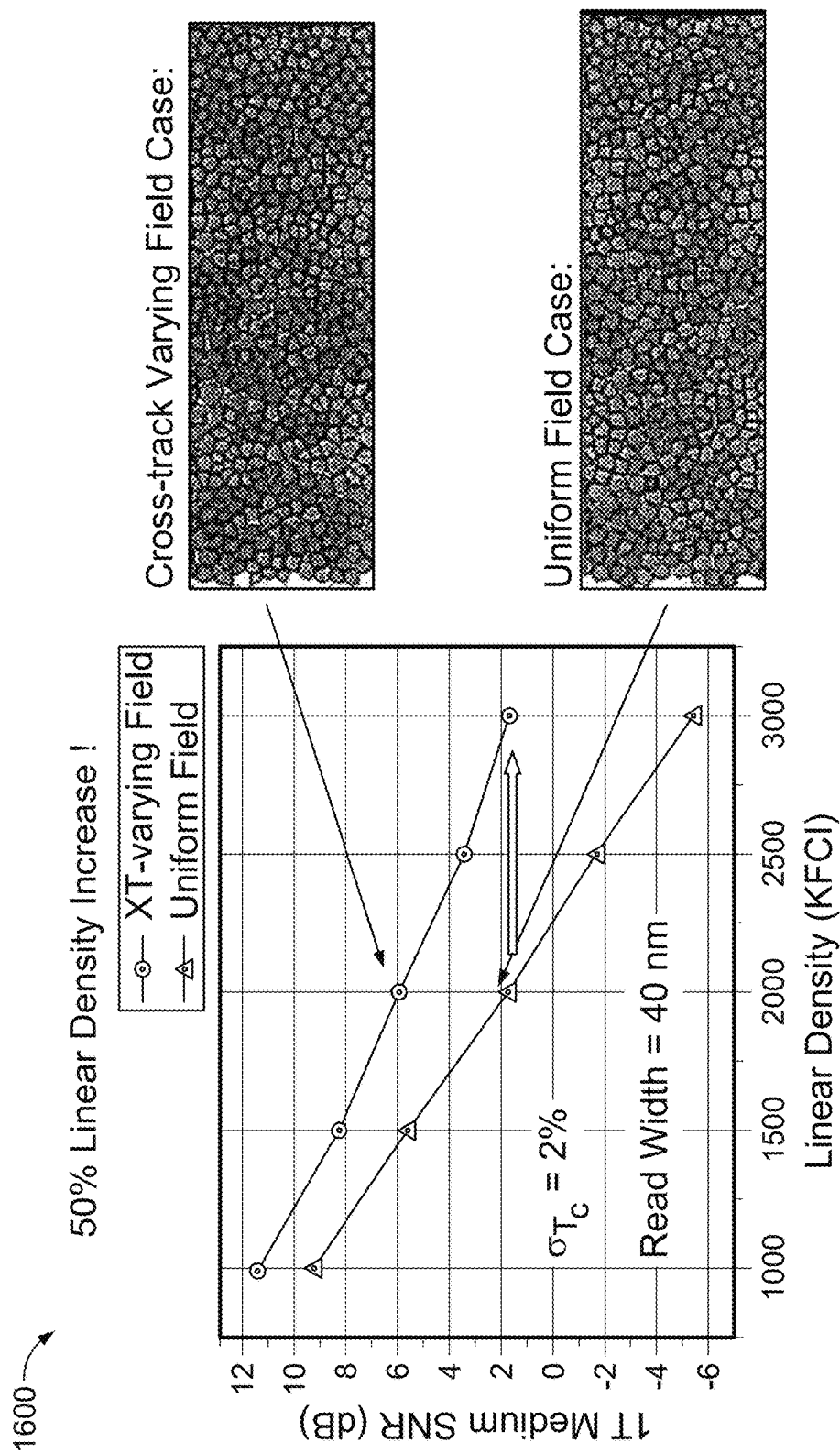
FIG. 16 shows a graph that includes a linear density for crosstrack varying field and uniform field.

Referring to FIG. 16, a medium SNR versus linear density graph 1600 is shown for crosstrack varying field case and the uniform field case, respectively with 2% Tc variation. As shown by the results, the crosstrack varying field case has a higher SNR for specified densities. As pointed out in FIG. 15, the crosstrack varying field case has a higher constant thermal gradient across the track, which makes the crosstrack varying field case more robust against Curie temperature variation. Since the Tc variation is the primary cause of transition jittering, which is dominant for high linear densities, the varying field takes advantage of HAMR potential because it allows high linear densities with a more constant thermal gradient.

Figure 17:
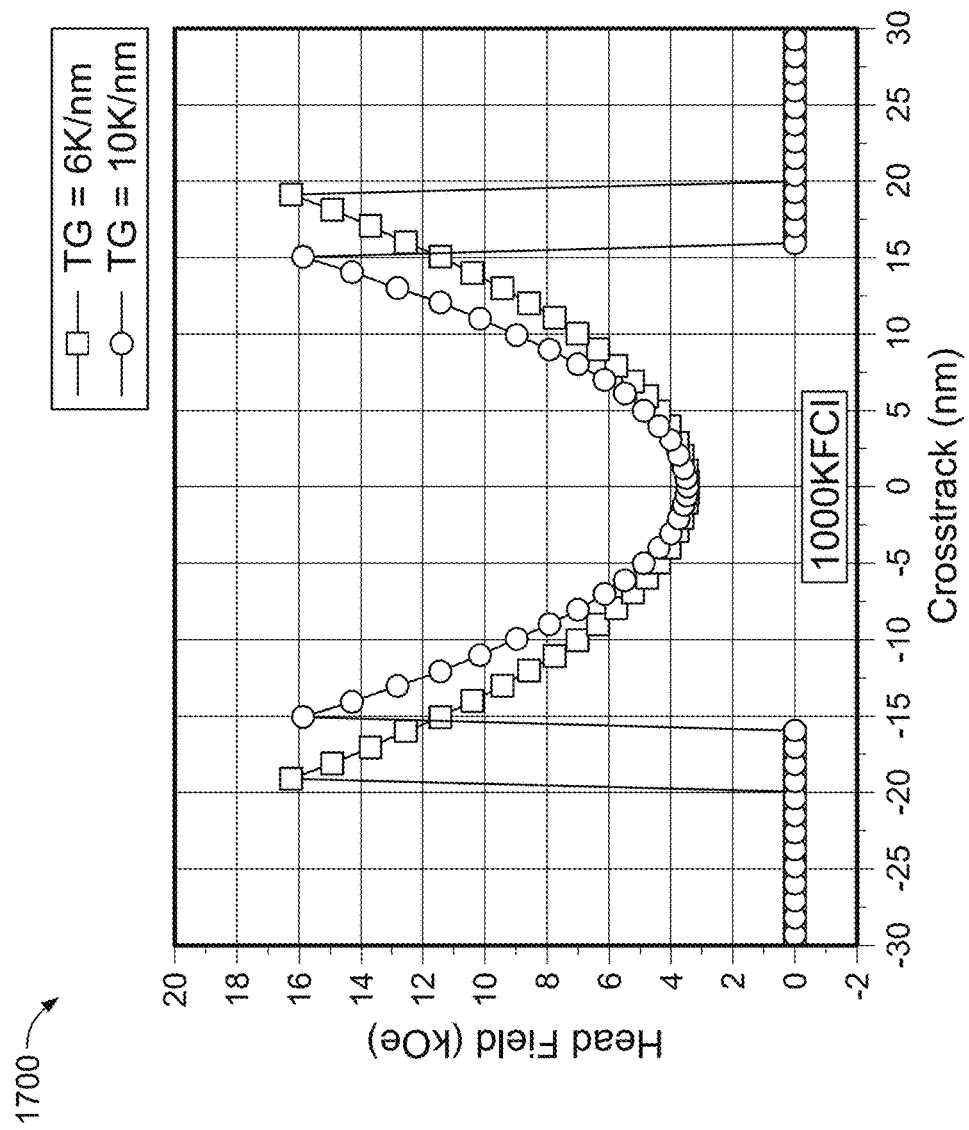
FIG. 17 shows a graph of head field as a function of the crosstrack position.

Through the procedure described above is for a specific thermal profile, the technique could be applied for different thermal profiles. FIG. 17 shows a graph 1700 of thermal profiles with different thermal gradients. For both cases, the head field includes a local minimum at the track center and starts increases as crosstrack position is away from the track center. A sharp field decay occurs near the track edge to avoid adjacent track erasure. Crosstrack field slope including a higher thermal gradient is also higher. Higher thermal gradient enables smaller grain recording and takes advantage of heat assisted magnetic recording potential.

Figure 18:
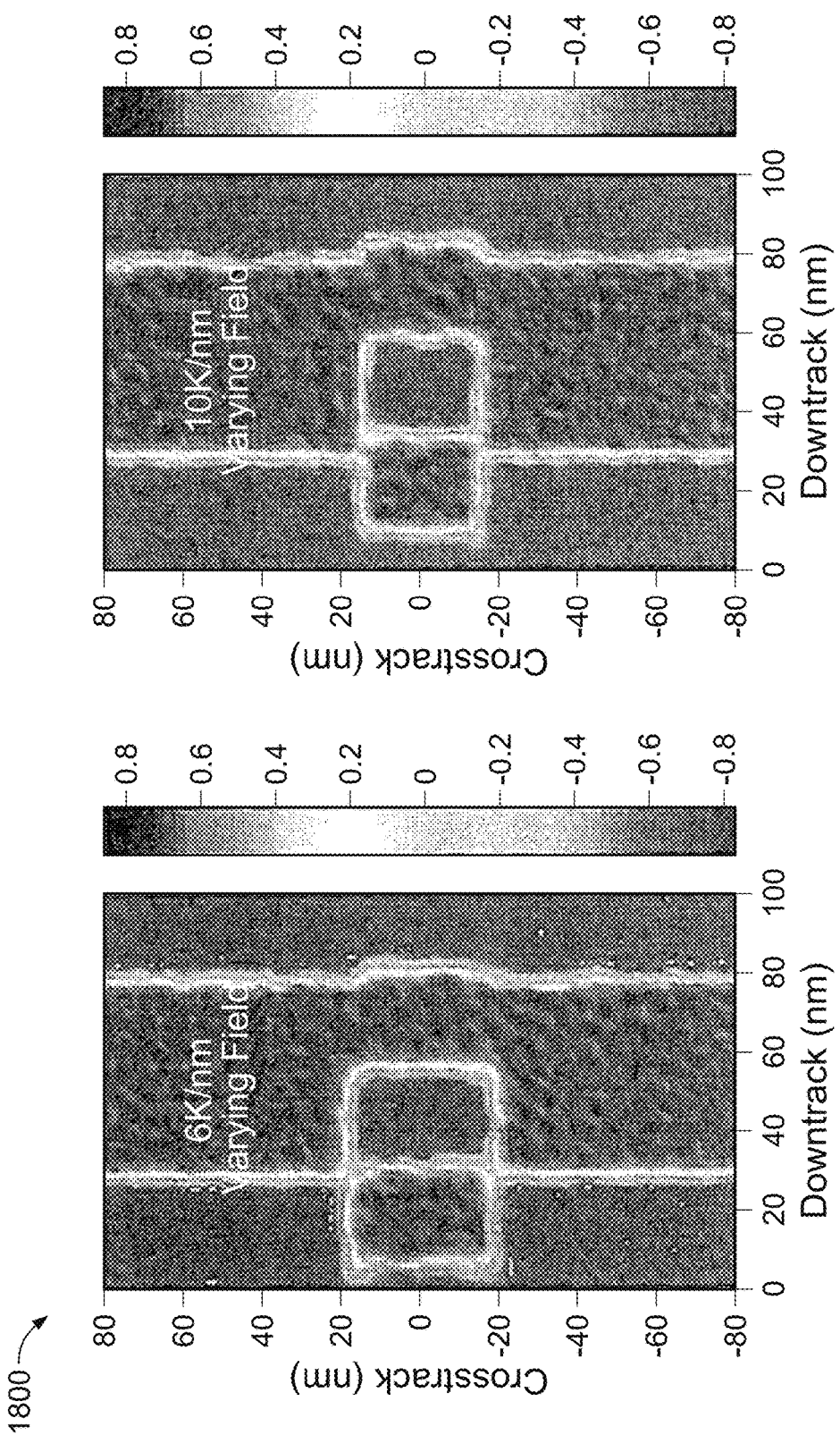
FIG. 18 shows magnetization recording patterns.

Referring to FIG. 18, recording patterns 1800 are shown. The crosstrack varying head field is constructed for both low (6K/nm) and high (K/nm) thermal gradient. Recording processes are conducted individually. The left graph and the right graph relates to the 6K/nm case and the 10K/nm case, respectively. The patterns show that the transition front is straightened for both cases. For the case of 6K/nm, the part at the track edge has even slight reverse curvature. The parabola approximation overestimates the approximate head field (e.g., as shown in FIG. 7, above). This type of transition enhances the reading quality since the reader is rectangular, and typically captures a straight transition signal.

Figure 19:
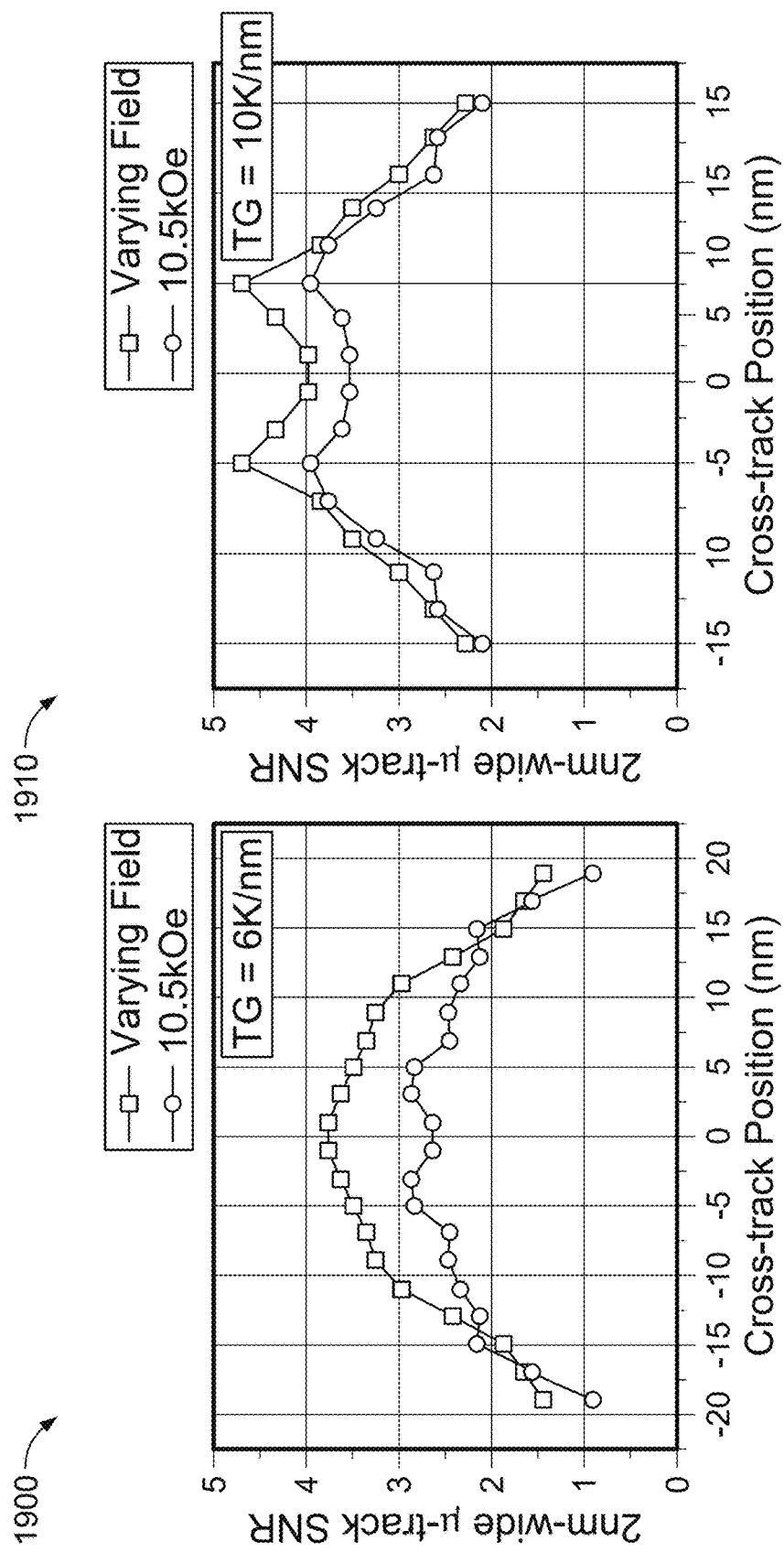
FIG. 19 shows signal-to-noise ratio (SNR) measurements.

FIG. 19 shows the medium signal-to-noise ratio (SNR) calculated using a 2-nm wide track width ideal reader. The left graph 1900 and right graph 1910 relate to low (6K/nm)

and high (10K/nm-20K/nm) thermal gradients, respectively. For both cases, the signal-to-noise ratio of crosstrack varying head field is significantly higher. This also indicates that at different crosstrack positions, the optimal head field varies for achieving ideal writing quality. The crosstrack-varying field also alleviates or eliminate transition edge curvature of the magnetic pattern.

By writing a sequence of transitions at a relatively low linear density for a series of uniform write field values (e.g., as described with respect to FIG. 6, above), a profile of crosstrack-varying field profile is determined for producing straightened transitions or transitions with reduced (e.g., relative to magnetic patterns formed using a crosstrack-uniform field profile) or eliminated transition edge curvature. For thermal profiles created in most near-field transducer designs, especially at narrow thermal track width, the write field near the track edges can be larger than the write field in the center of the track for the crosstrack field profile to minimize the transition curvature. In addition, the field drops beyond the track edges, (e.g., as described in relation to FIGS. 7 and 9 above), so that the track is defined by the write field rather than thermal profile. By using write heads that provide the field profiles with the above features, increasing laser power increases the written track width by a limited amount, if at all, enabling higher recording densities in the magnetic storage medium.

In order to produce the appropriate crosstrack field profile (e.g., the crosstrack write field profile or magnetic field profile) for reducing or eliminating transition curvature (e.g., as shown in FIG. 7), the write head produces the above-described magnetic field profile, and the heating temperature by the near-field transducer is approximately the recording temperature. The downtrack field gradient can be relatively small, compared to the crosstrack gradient. In some implementations, the downtrack field gradient can be matched to the downtrack thermal gradient to produce a similar enhanced effect as in the crosstrack direction and further control a portion of the magnetization pattern in the downtrack direction. The cross track profile can include a comparatively large variation over the narrow track width, as described above.

Figure 20:
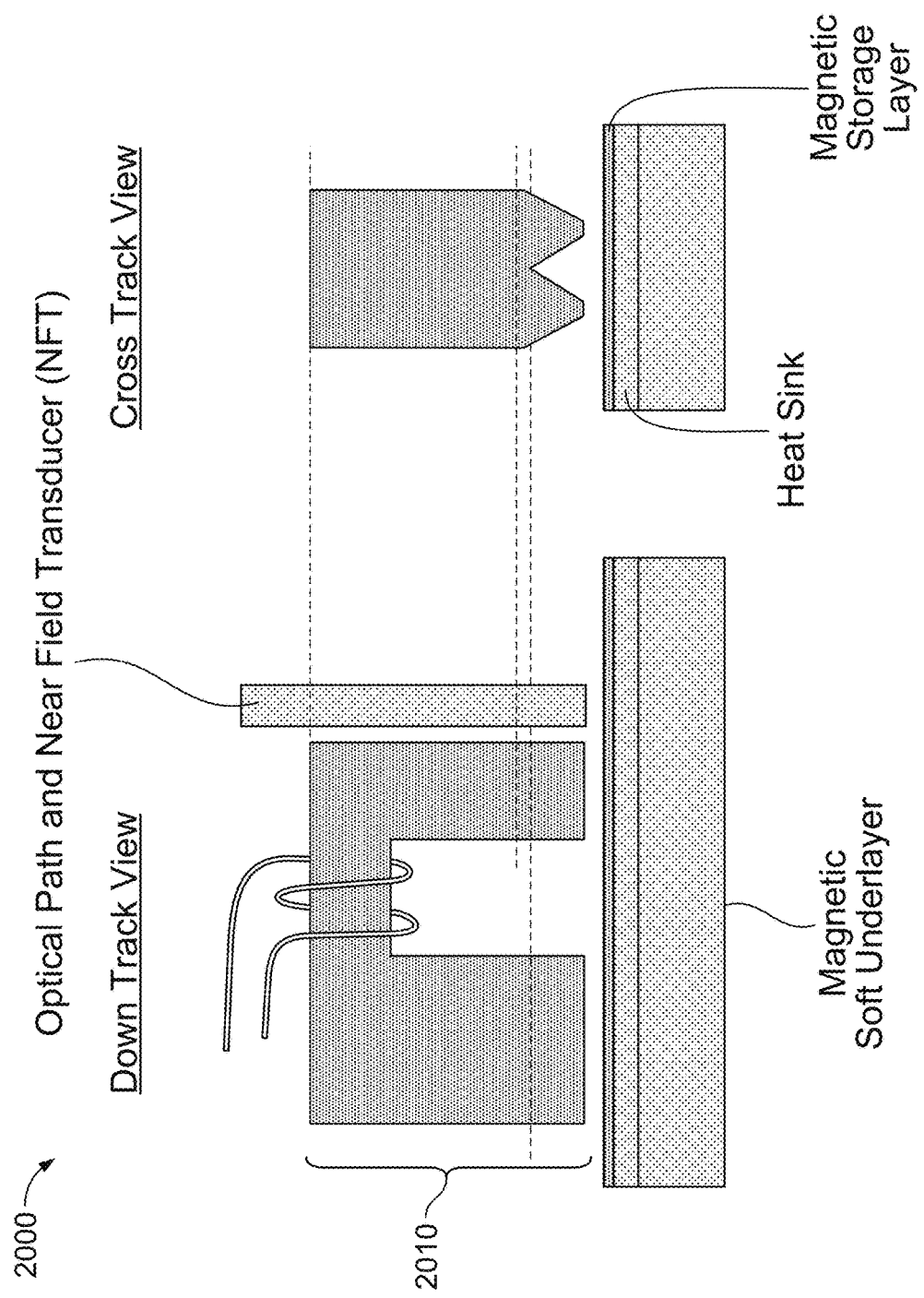
FIG. 20 a schematic drawing of a write head design.

FIG. 20 shows views 200 of a write head 2010 for producing a varying crosstrack magnetic field profile (e.g., magnetic pattern) similar to that shown in FIG. 7. A notch-like groove (e.g., indent) is approximately in the middle of the write pole (the magnetic pole next to the near field transducer) with base right at the air-bearing surface (ABS). In some implementations, the write pole includes a tapered end towards the ABS in the crosstrack direction (e.g., facing the crosstrack axis) with the physical width of the tapered write pole similar to or narrower than the intended write width. The tapering enables larger write fields near the track edge, and also allows a field that drops sharply in magnitude beyond the physical write pole width at ABS, such as described with respect to FIG. 7.

A soft under layer (SUL) in the magnetic storage medium enhances the field strength and confines field spatial distribution across the medium. A return pole combined with the SUL forms a closed magnetic flux loop that enhances an efficiency of a driving current to the write head for generating a magnetic field profile and a magnetic pattern. In some implementations, a downtrack length of the return pole is significantly greater than that of the write pole.

Figure 21:
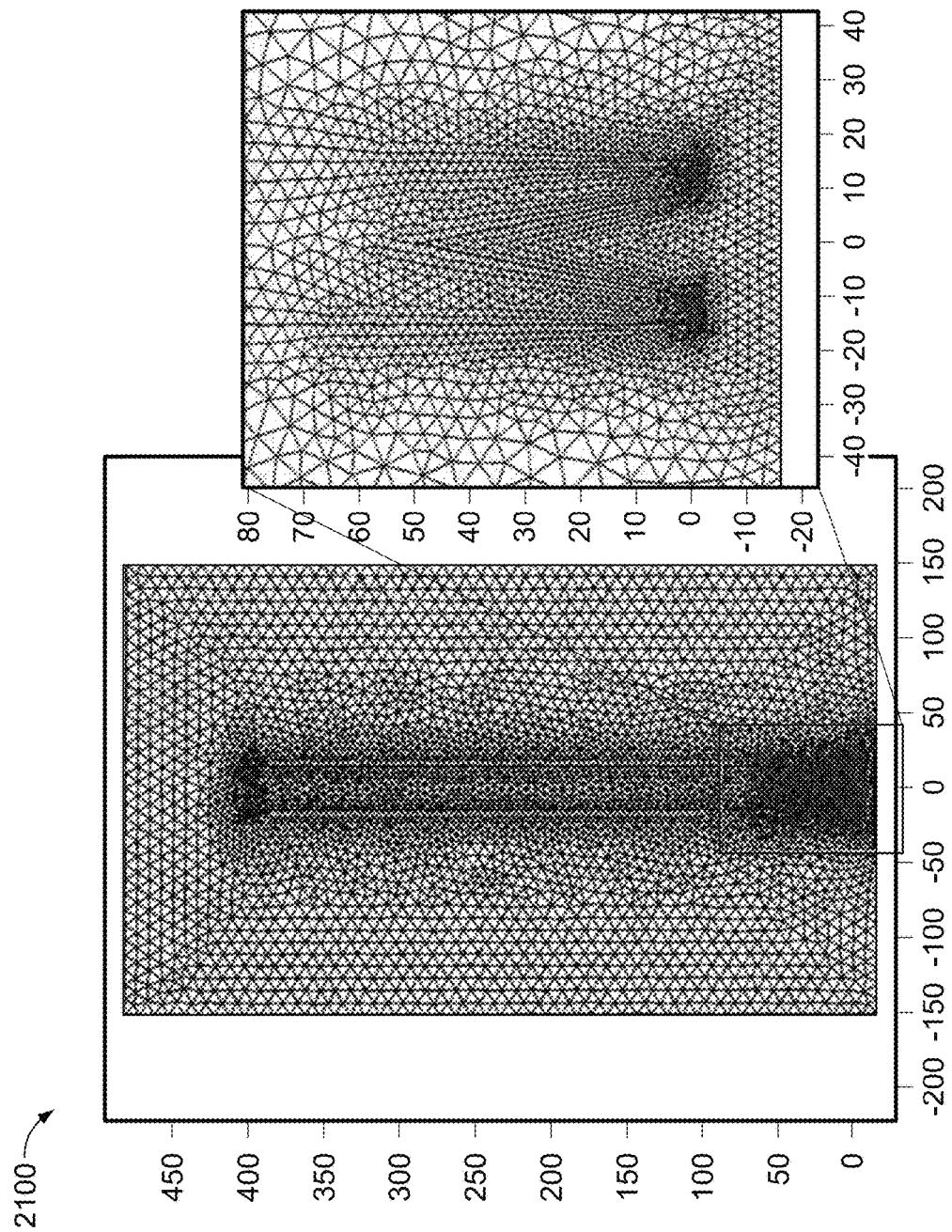
FIG. 21 data of a finite-element-method analysis.

Referring to FIG. 21, a trial-simplified design 2100 of write pole shape is presented with the adaptive meshing in COMSOL using finite-element-method (FEM). The write pole width has a triangular notch. The parts near the tip are meshes with finer cells to assure calculation precision.

Figure 22:
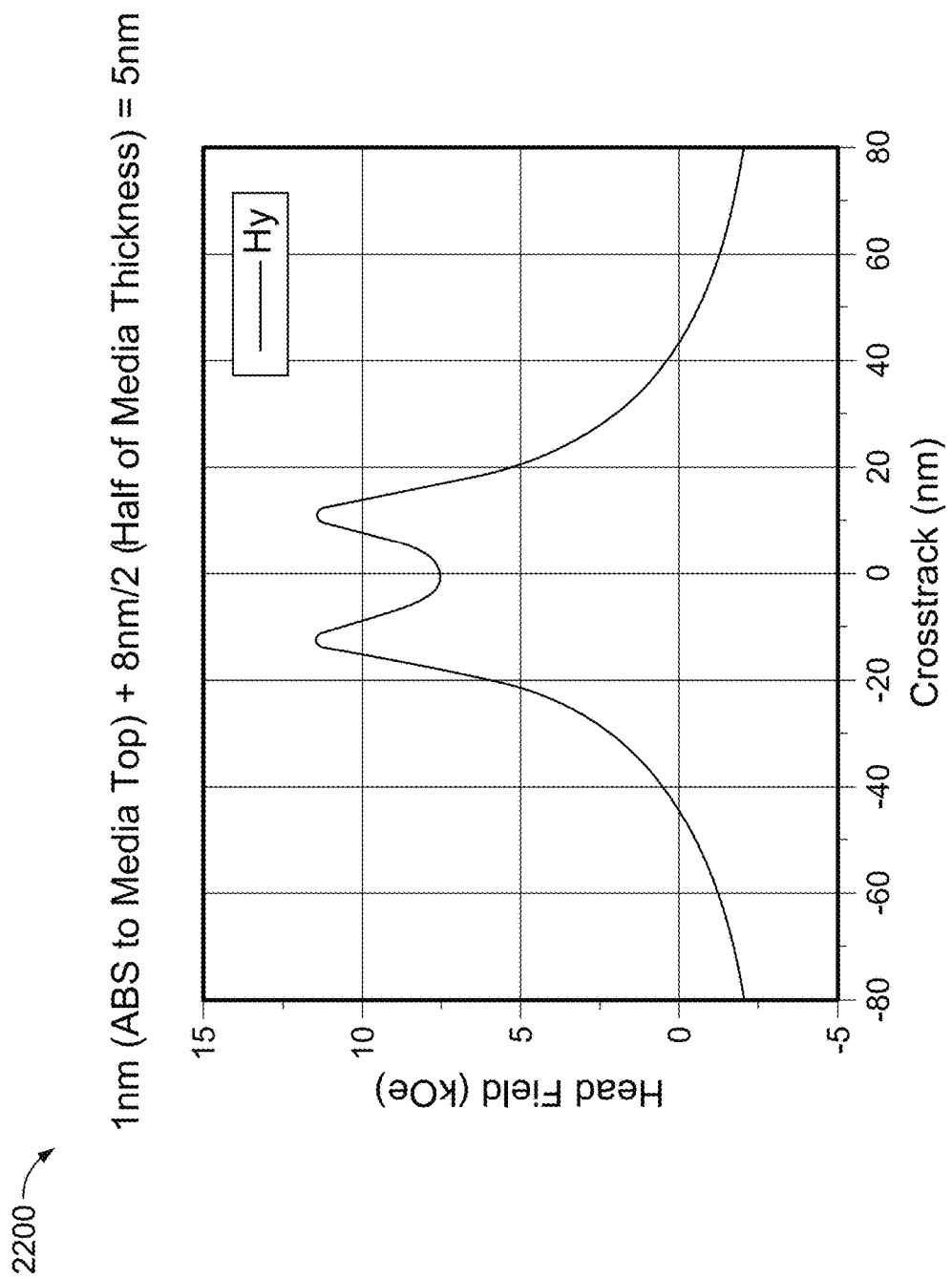
FIG. 22 shows the calculated vertical component of magnetic field.

FIG. 22 shows a graph 2200 displaying a vertical component of the magnetic field. The vertical component is calculated after FEM calculation, using COMSOL. The crosstrack field varies from 10-20 kOe. This test shows a validation of the viability of this technique. The head field is modeled to be approximately 45 degrees, which contributes to larger effective field change. Such an effect is realized by tuning the write pole indent shape or the distance between the optical spot and magnetic pole so that the magnetic field varies approximately as shown.

Figure 23:
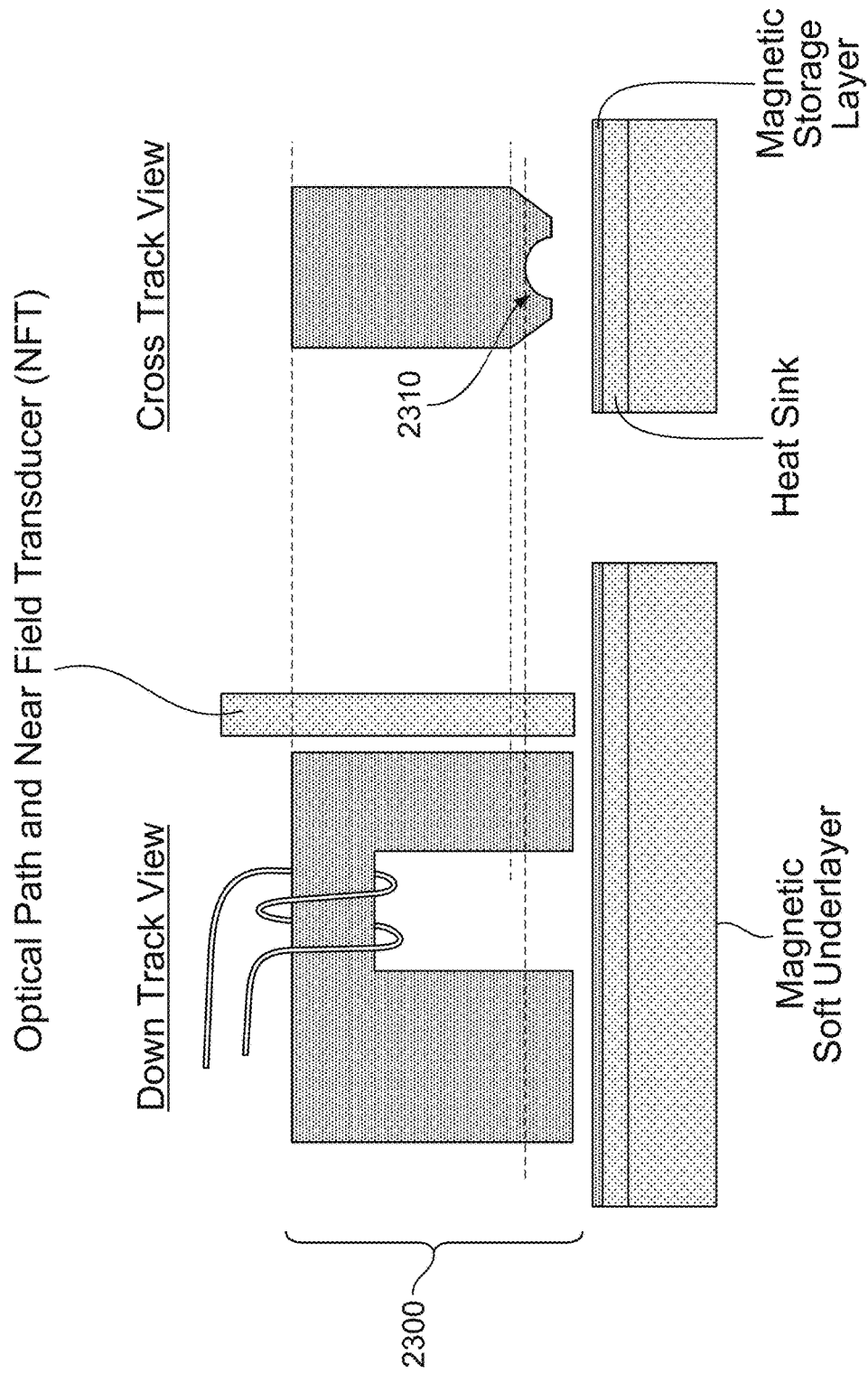
FIGS. 23-28 show views of recording heads.
Figure 24:
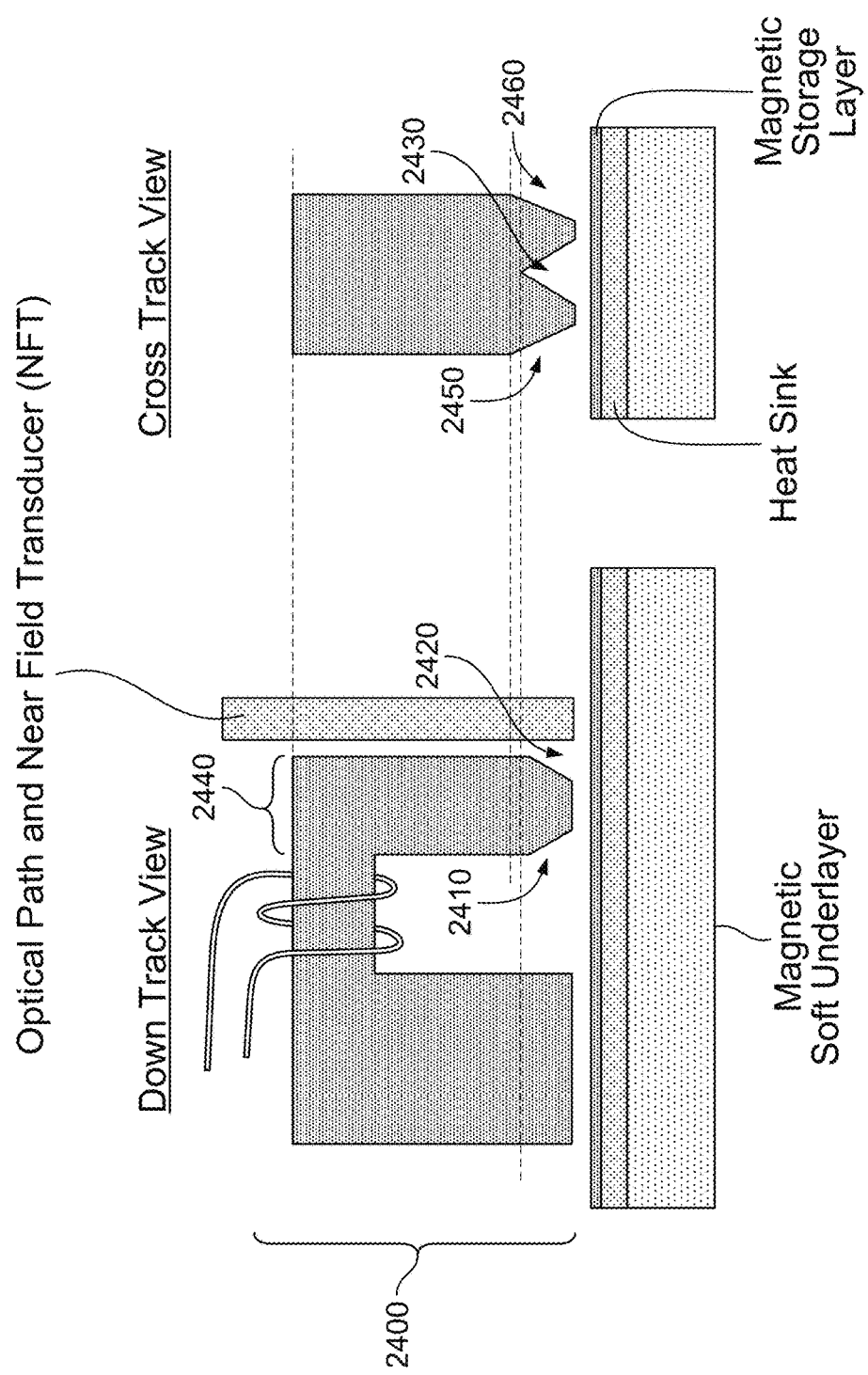
Figure 25:
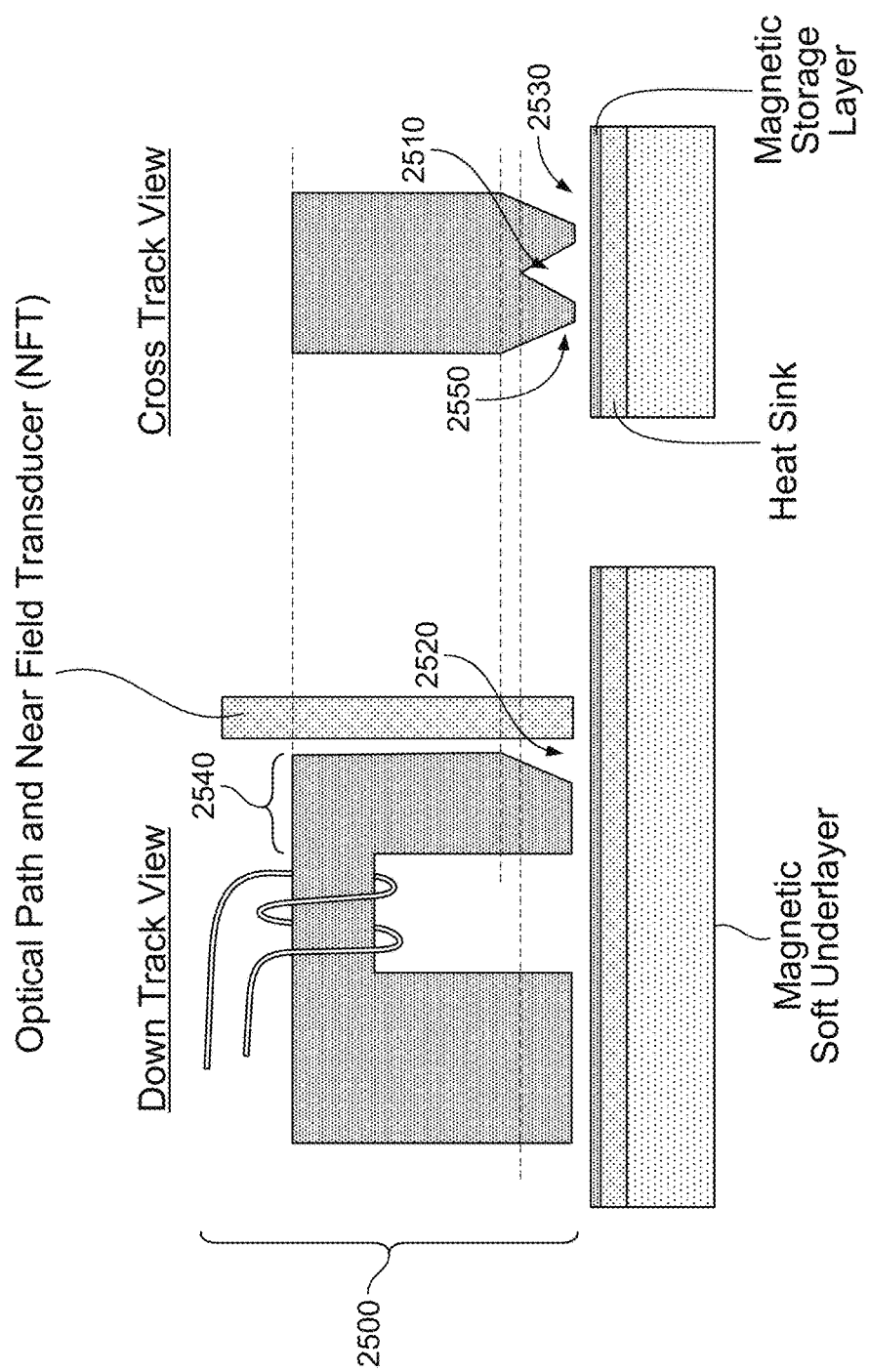
Figure 26:
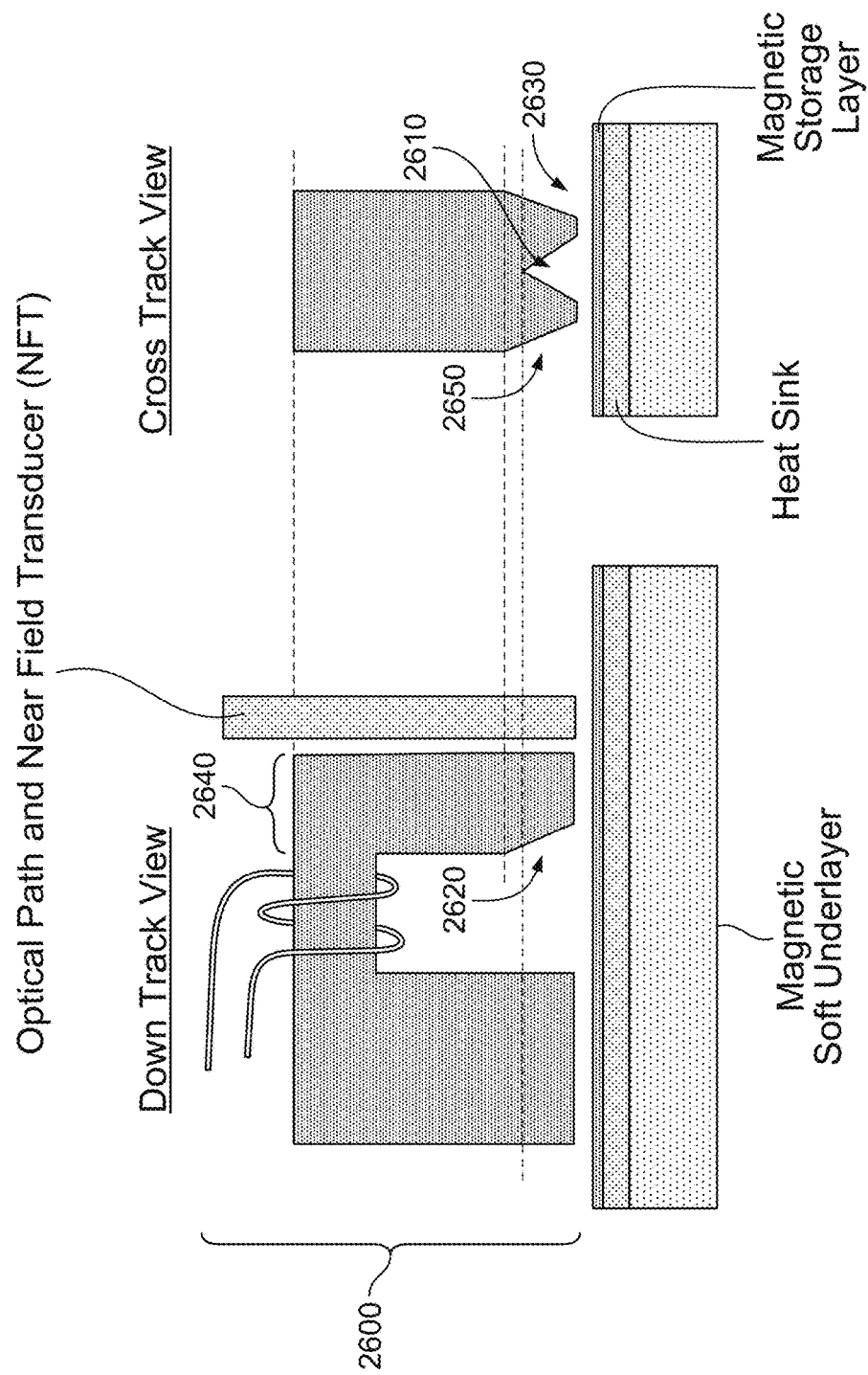
Figure 27:
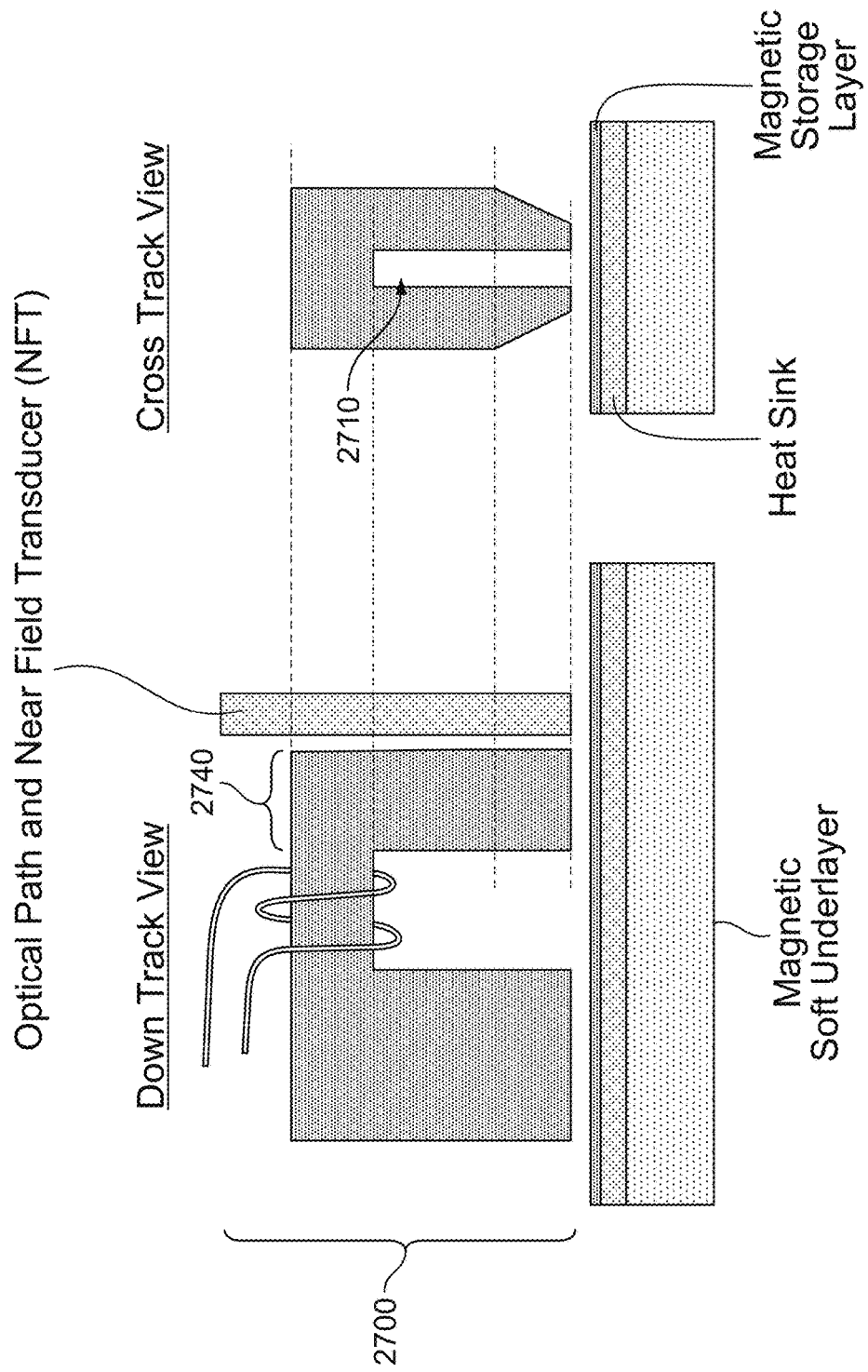

FIGS. 23-27 show recording head designs that have different indent shapes for producing the crosstrack field profiles (and resulting magnetic patterns) described above. In some implementations, the exact shape of the indent is triangular as shown in FIG. 21. Referring to FIG. 23, recording head 2300 includes an indent 2310. The indent 2310 shape comprises an arcuate edge, such as a parabola or a fraction of circle. In some implementations, any geometric shape that yields a crosstrack field profile similar to that shown in FIG. 7 or FIG. 9 for minimizing or even completely eliminating transition edge curvature can be used. FIGS. 24-26 shows a recording heads 2400, 2500, and 2600, respectively, with triangular indents 2430, 2510, and 2610, respectively. FIG. 27 shows recording head 2700 with a slot 2710.

FIGS. 24-26 show examples of write poles that include tapers in downtrack directions. Referring to FIG. 24, the write pole 2440 includes tapers at two downtrack sides that each face the downtrack axis. A first side, leading end (closer to NFT) includes taper 2420. A second side, a trailing end (farther away from NFT), includes taper 2410. The tapering in the downtrack direction yields higher write field intensity in the magnetic storage layer. The tapering angle with respect to the ABS includes angles within the range of approximately 25° to 65°.

The write pole 2440 of FIG. 24 also can include crosstrack tapers 2450, 2460 on crosstrack sides of the write pole 2440 that face the crosstrack axis to produce the sharp filed drop-off beyond the track, as described above (e.g., with respect to FIG. 7). In some implementations, tapers 2450, 2460 are combined with one or more of the downtrack tapers 2410, 2420 and different indent shapes of FIGS. 23-27 to produce a crosstrack varying field.

FIG. 25 shows recording head 2500 including write pole 2540. A single downtrack taper 2520 is included on a side of the write pole 2540 near the near-field transducer. Two crosstrack tapers 2530, 2550 are included on either crosstrack side facing the crosstrack axis of a triangular-shaped indent 2510.

FIG. 26 shows recording head 2600 including write pole 2640. A single downtrack taper 2620 is included on a side of the write pole 2640 opposite the near-field transducer, facing the downtrack axis. Two crosstrack tapers 2630, 2650 are included on either crosstrack side, which each face the crosstrack axis, of a triangular-shaped indent 2610.

FIG. 27 shows a recording head 2700 comprising a slit 2710 in the write pole 2740. The write pole 2740 generates a crosstrack field profile including a higher intensity near the track edges and relatively lower intensity near the center of the track.

Figure 28:
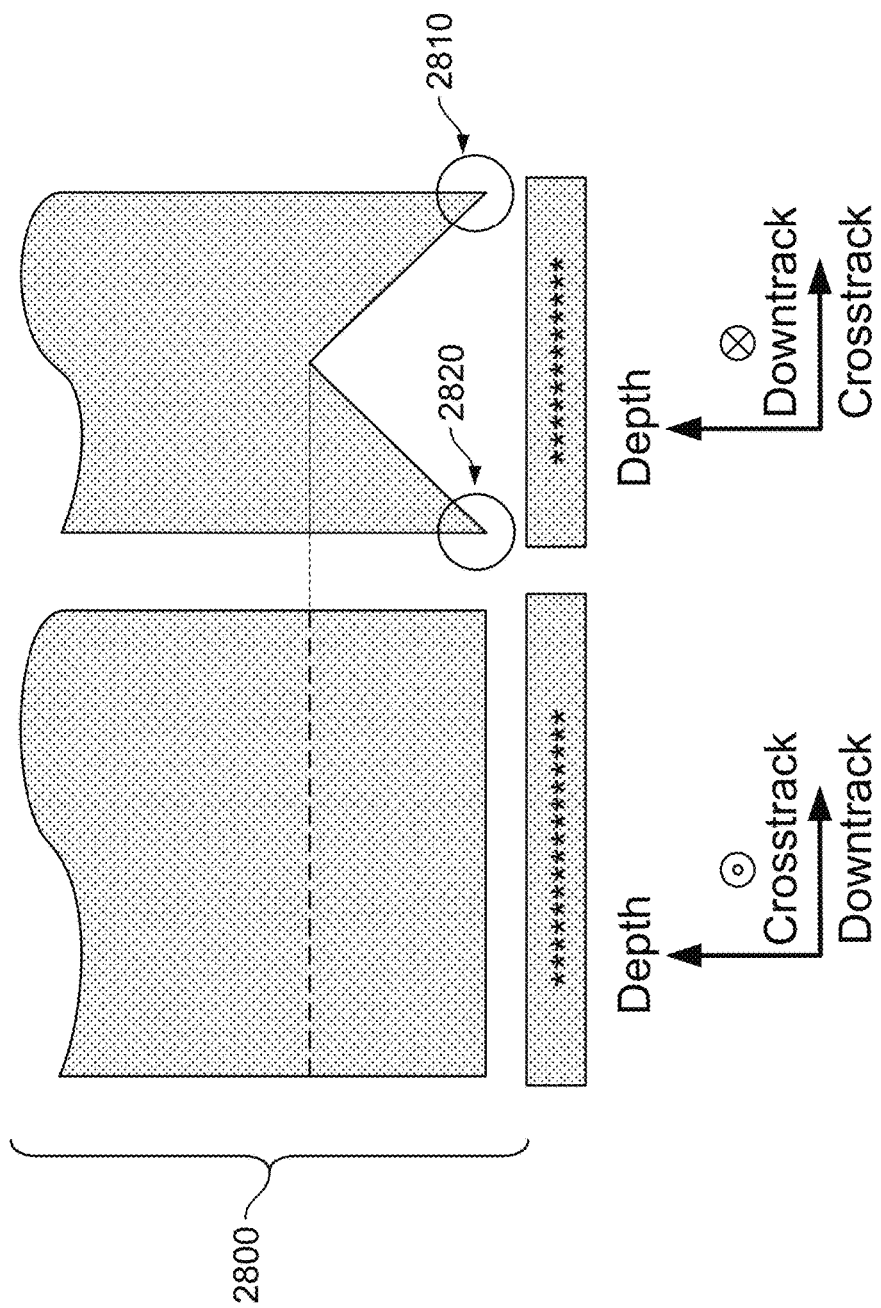

FIG. 28 shows a recording head 2800 that is similar to recording head 2000 of FIG. 20. Rerecording head 2800 includes pointed edges 2810, 2820 of the air-bearing surface. The pointed edges 2810, 2820 of the write pole as viewed from the crosstrack direction are pointed toward the magnetic storage medium and generate higher field intensities in the magnetic storage layer than other portions of the write pole.

Using the above-described recording head designs that generate crosstrack-varying write head field, the transition edge curvature of the magnetic pattern generated in the magnetic storage is reduced to be approximately linear.

What is claimed is:

1. A recording head comprising:
a near-field transducer configured to heat one or more portions of a magnetic storage layer to generate a thermal profile in the magnetic storage layer; and
a write pole configured to generate a magnetization pattern, in the magnetic storage layer, that overlaps with the thermal profile in the magnetic storage layer;
wherein the write pole comprises:
a first side facing a first axis that is approximately orthogonal to a second axis along which the write pole is configured to move across the magnetic storage layer;
a second side opposite the first side; and
a non-uniform surface that faces the magnetic storage layer, the non-uniform surface configured to cause a portion of the magnetization pattern to be approximately linear;
wherein the first side, the second side, or each of the first and second sides comprises a tapered edge proximate to the non-uniform surface.

2. The recording head of claim 1, wherein the non-uniform surface of the write pole is configured to reduce an amount of curvature of the portion of the magnetization pattern, relative to an amount of curvature of the portion of the magnetization pattern formed by a write pole with a uniform surface.

3. The recording head of claim 2, wherein the non-uniform surface of the write pole is configured to eliminate the amount of curvature of the portion of the magnetization pattern.

4. The recording head of claim 1, wherein an angle of at least one tapered edge is between 25-65 degrees with respect to the non-uniform surface.

5. The recording head of claim 1, wherein the write pole further comprises:
a third side facing the second axis along which the write pole is configured to move across the magnetic storage layer; and
a fourth side opposite the third side, the fourth side being further from the near-field transducer than the third side,
wherein the third side, the fourth side, or each of the third and fourth sides comprises an additional tapered edge proximate to the non-uniform surface.

6. The recording head of claim 5, wherein an angle of at least one additional tapered edge is between 25-65 degrees with respect to the non-uniform surface.

7. The recording head of claim 1, wherein the non-uniform surface comprises an indent forming an arcuate edge.

8. The recording head of claim 1, wherein the non-uniform surface comprises an indent forming a triangular notch.

9. The recording head of claim 1, wherein the non-uniform surface comprises a slot.

10. The recording head of claim 1, wherein the write pole is configured to record, in the magnetic storage layer, at a density of up to approximately 3.0 million flux changes per inch (MFCI).

11. The recording head of claim 1, wherein the write pole is configured to generate the magnetization pattern, in the magnetic storage layer, to be less than 60 nanometers along a recording track in the magnetic storage layer.

12. The recording head of claim 1, wherein the write pole is configured to cause a magnetic field, across the magnetic storage layer, comprising an intensity that varies in an approximately parabolic manner across a recording track of the magnetic storage layer.

13. The recording head of claim 1, wherein the write pole is configured to cause a magnetic field in proximity to one or more edges of a recording track in the magnetic storage layer, with an increased intensity relative to an intensity of the magnetic field in proximity to a center of the recording track in the magnetic storage layer.

14. The recording head of claim 1, wherein the non-uniform surface comprises a pointed tip configured to extend toward the magnetic storage layer.

15. The recording head of claim 1, wherein the near-field transducer is configured to generate the thermal profile comprising a thermal gradient between 6K/nm-20K/nm.

16. The recording head of claim 1, wherein the magnetic pattern in the magnetic storage layer represents a unit of data.

17. The recording head of claim 1, wherein the portion of the magnetization pattern, in the magnetic storage layer, is approximately orthogonal to an axis of motion of the write pole.

18. The recording head of claim 1, wherein the non-uniform surface is an indented air-bearing surface.

19. A recording head for heat-assisted magnetic recording, the recording head comprising:
a near-field transducer configured to generate a thermal profile in a magnetic storage layer of a data storage device; and
a write head configured to generate a magnetization pattern in the magnetic storage layer of the data storage device that overlaps with the thermal profile of the magnetic storage layer, the write head comprising:
a return pole; and
a write pole connected to the return pole and positioned between the near-field transducer and the return pole, the write pole comprising a surface parallel to the magnetic storage layer,
wherein the write pole comprises a first side facing the return pole and a second side facing the near-field transducer, with the second side being positioned in the write pole and opposite to the first side,
wherein the write pole is tapered on both a third side and a fourth side that is positioned in the write pole opposite to the third side, and
wherein the surface comprises an indent extending from the first side of the write pole to the second side of the write pole.

20. The recording head of claim 19, wherein a portion of the first side that is in proximity to the surface is tapered.

21. The recording head of claim 19, wherein the indent comprises a triangle-shaped notch.

22. The recording head of claim 19, wherein the write head is configured to record in the magnetic storage layer at a density of up to approximately 3.0 million flux changes per inch (MFCI).

23. The recording head of claim 19, wherein the surface of the write pole is shaped by the indent to cause a portion of a boundary of the magnetization pattern to be approximately linear, the portion of the boundary being approximately orthogonal in the magnetic storage layer to an axis of motion of the write head.

* * * * *